(12) United States Patent
Maeda et al.

(10) Patent No.: US 6,986,095 B2
(45) Date of Patent: Jan. 10, 2006

(54) ERROR CORRECTION DEVICE

(75) Inventors: Toshinori Maeda, Negagawa (JP);
Toru Kakiage, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 888 days.

(21) Appl. No.: 09/848,218

(22) Filed: May 4, 2001

(65) Prior Publication Data

US 2002/0166090 A1 Nov. 7, 2002

(51) Int. Cl.
*G11C 29/00* (2006.01)
*H03M 13/00* (2006.01)
(52) U.S. Cl. ................. 714/769; 714/772; 714/755
(58) Field of Classification Search ........... 714/763, 714/764, 765, 766, 767, 768, 769, 770, 772, 714/773, 775
See application file for complete search history.

(56) References Cited

U.S. PATENT DOCUMENTS 5,592,498 A * 1/1997 Zook ................. 714/763
5,991,911 A * 11/1999 Zook ................. 714/758

FOREIGN PATENT DOCUMENTS

| JP | 63-197123 | 8/1988 |
| JP | 06-326689 | 11/1994 |

* cited by examiner

*Primary Examiner*—Joseph Torres
(74) *Attorney, Agent, or Firm*—Parkhurst & Wendel, L.L.P.

(57) ABSTRACT

For reducing time required for error correction in an error correction device, data are transferred from a buffer memory not only to a syndrome calculator but also to an error detector at the same time, and until the syndrome calculator detects an error-containing code, the error detector performs error detection in parallel with the syndrome calculation done by the syndrome calculator. During error detection after the error corrector corrects the error, mid-term results of the error detection obtained before an error-containing code is detected are used. Consequently, it becomes unnecessary to transfer all data from the buffer memory to the error detector, thereby making execution of an error detection process possible at a halfway point.

11 Claims, 21 Drawing Sheets

Fig. 21A

| Process Unit | Processing Targets | | | |
|---|---|---|---|---|
| | ECC | Selector | Word | Vertical |
| First Syndrome Calculator | 1 | 2 | 3 | — |
| 〃 | | 〃 | 〃 | 〃 |
| First Error Detector | — | — | | 13 |
| 〃 | 〃 | 〃 | 〃 | |
| 〃 | 〃 | 〃 | 〃 | 〃 |

Fig. 21B

| ECC | Site | Selector | Word | Vertical | Number of Times |
|---|---|---|---|---|---|
| First ECC | In Process of Demodulation | 6 | 2 | 3 | 1 |
| Second ECC | Buffer Memory | 9 | 2 | 3 | 2 |
| 〃 | Buffer Memory | 〃 | 〃 | 〃 | 〃 |

ERROR CORRECTION DEVICE

BACKGROUND OF THE INVENTION (1) Field of the Invention

The present invention relates to error correction, and more specifically, to an error correction device used for optical disks having a data structure composed of a main data unit and a parity unit.

(2) Description of the Prior Art

In recent years, DVDs (digital versatile discs) and CD-ROMs (compact disc-read-only memories) for recording digital data at high densities have come to be widely used. The digital data, which are recorded or read by a laser, are very small in size. No matter how carefully these media may be fabricated or handled, it is difficult to prevent them from getting fingerprints or blemishes on their surface.

Hence, the use of error correcting technology is essential. However, in such a case where 1-bit parity is merely appended to every 7-bit main data, if an error arises, its presence is known but its location and the original data remain unknown. Moreover, if two errors arise, their occurrence itself is unknown. To solve this problem, as shown in FIGS. 1 and 2, error correction is performed by providing data with parity having a complicated structure in the vertical and the horizontal direction. According to this system, even if several errors arise, they will be found in real time and corrected.

There have been various techniques developed as methods for appending parity, one of them being RS code correction which comes down error correction to a question of solving a numerical formula. Since RS code correction is a known art shown in *FUGO RIRON NYUMON* or *Introduction to the Theory of Codes* written by Iwatare and published by Shoseido, *JISSEN AYAMARI TEISEI GIJUTU*, or *A Hands-on Technique of Error Correction* published by TRICEPTS, and the like, its description will be omitted.

In optical disks such as DVDs and CD-ROMs, error correction of data is performed in compliance with individual data formats.

The following is a description of error correction for a DVD. The data format in one sector is shown in FIG. 1, and the data format in one block including error correcting codes (ECCs) is shown in FIG. 2. As shown in FIG. 1, one sector includes a header, main data, and an error detecting code (EDC). The block including the ECCs shown in FIG. 2 contains the sector shown in FIG. 1, and has product codes with inner code parity for horizontal error correction and outer code parity for vertical error correction. (In the present specification, as a rule, the sector shown in FIG. 1+the inner code parity on the right side in FIG. 2 is referred to as a sector).

In an error correction device for DVDs, it is general that demodulated data are temporarily written in the buffer memory and read later in order to execute error correction for the data in the buffer memory because error correction in real time takes much time, considering it is done by an electronic device, and has to be repeated until no error is left. In this case, there are horizontal error correction with inner code parity and vertical error correction with outer code parity.

In horizontal error correction for consecutive main data such as image data, syndrome calculation is performed every code word (string) (consisting of 172-byte data and 10-byte inner code parity) to detect an error-containing code, and error correction is performed by calculating the position and value of the error, based on the data of the detected code. In vertical error correction, syndrome calculation is performed every code word (consisting of 192-byte data and 16-byte outer code parity) to detect an error-containing code, and the position and value of the error are calculated, based on the data of the detected code. Following error correction repeated for a predetermined number of times in the horizontal direction first and then in the vertical direction, error detection is performed in order to check to see that no error remains in the data (or that the error correction is successfully done) by using each EDC. If no error is detected, this means that the error correction is complete.

Then, data in the buffer memory whose error has been corrected are transmitted downstream, and data in the next sector obtained from upstream are written in the buffer memory.

A prior art error correction device is shown in FIG. 3. This device comprises a system control unit 1 which controls the entire system, a DMA control unit 2 which controls DMA (direct memory access) transfer described below between buffer memory and each unit, a bus control unit 3, a buffer memory 4 which stores demodulated data, a syndrome calculator 5 for generating syndrome that is an equation to be solved for error correction, an error corrector 6 which performs error correction by calculating the position and value of an error, based on the syndrome generated by the syndrome calculator 5, and an error detector 7 which detects the presence or absence of an error in the data which has been subjected to error correction, or which checks to see that all errors have been corrected. The bus control unit 3, the buffer memory 4, the syndrome calculator 5, the error corrector 6, and the error detector 7 are connected with each other via a data bus 11.

A DMA command 12 is transmitted from the system control unit 1 to the DMA control unit 2 in order to provide instructions to execute DMA. (The drawing shows the signal line of the command 12 for the sake of convenience. This holds true for the other signals). A DMA request 13 is transmitted from the DMA control unit 2 to the bus control unit 3 in order to request DMA. A buffer memory access signal 14 is transmitted to execute the reading or writing of data from or to the buffer memory 4. A syndrome data supply signal 15 indicates the supply of data in the buffer memory 4 to the syndrome calculator 5. Syndrome 16 is the product in the syndrome calculator 5.

An access request signal 17 is transmitted from the error corrector 6 to the bus control unit 3 in order to request access to the buffer memory 4. An error corrector access signal 18 is transmitted to execute the reading or writing of data from or to the error corrector 6. An error correction completion signal 19 indicates that error correction is completed in the error corrector 6. An error detector data supply signal 20 indicates the supply of data from the buffer memory 4 to the error detector 7. An error detection signal 21 indicates whether or not an error has been detected by the error detector 7.

FIG. 4 shows the procedure of horizontal error correction in one sector.

The procedure of horizontal error correction in one sector in the prior art error correction device will be described as follows with reference to FIGS. 3 and 4.

Step (a-1): the system control unit 1 outputs the DMA command 12 to the DMA control unit 2 so as to provide instructions to transfer data equivalent to one code word×13 times from the buffer memory 4 to the syndrome calculator 5.

Step (a-2): the DMA control unit 2 outputs the DMA request 13 to the bus control unit 3 so as to request the data transfer from the buffer memory 4 to the syndrome calculator 5.

Step (a-3): the bus control unit 3 puts the data bus 11 in commission, and outputs the buffer memory access signal 14 and the syndrome data supply signal 15 to the buffer memory 4 and the syndrome calculator 5, respectively, so as to execute the data transfer from the buffer memory 4 to the syndrome calculator 5.

Step (a-4): the syndrome calculator 5 performs error detection every transferred code word, and outputs the syndrome 16 to the error corrector 6 if there is an error.

Step (a-5): the error corrector 6 calculates the position and value of the error, based on the syndrome 16. In order to correct an error in data on the buffer memory 4, the error corrector 6 provides the bus control unit 3 with the access request signal 17, thereby requesting readout of the error-containing data.

Step (a-6): after putting the data bus 11 in commission, the bus control unit 3 outputs the buffer memory access signal 14 and the error corrector access signal 18 to the buffer memory 4 and the error corrector 6, respectively, reads error-containing data from the buffer memory 4, and supplies the data to the error corrector 6.

Step (a-7): after correcting the error in the data supplied, the error corrector 6 transmits the access request signal 17 to the bus control unit 3 again so as to request writing of the error-corrected data in the buffer memory 4.

Step (a-8): after putting the data bus 11 in commission, the bus control unit 3 reads the error-corrected data from the error corrector 6 and overwrites the data in the buffer memory 4. At the same time, the error corrector 6 transmits the correction completion signal 19 to the system control unit 1.

Step (a-9): in order to check to see that the corrected data contain no more error, the system control unit 1 transmits the DMA command 12 to the DMA control unit 2 so as to provide instructions to transfer the data from the buffer memory 4 to the error detector 7.

Step (a-10): the DMA control unit 2 outputs the DMA request 13 to the bus control unit 3 so as to request the data transfer from the buffer memory 4 to the error corrector 7.

Step (a-11): after putting the data bus 11 in commission, the bus control unit 3 outputs the buffer memory access signal 14 and the error detector data supply signal 20 to the buffer memory 4 and the error detector 7, respectively, so as to execute the data transfer from the buffer memory 4 to the error detector 7.

Step (a-12): the error detector 7 performs error detection for the data transferred, and transmits the error detection signal 21 to the system control unit 1 in order to inform whether an error has been detected or not.

Through these steps, the horizontal error correction for one sector is complete.

In the same manner, horizontal error correction is executed for the subsequent 15 sectors including the outer code parity unit so as to complete the horizontal error correction for one block. If no error is detected from all sectors, the error correcting operation is complete; if there is an error detected even from one sector, the next process including vertical error correction will be executed.

The above-described prior art method, however, takes much time in a series of operations: the syndrome calculation by the syndrome calculator 5, the error correction by the error corrector 6, and the error detection by the error detector 7 done in this order. Above all, it is time-consuming to access the buffer memory 4 as storing means and to read data therefrom repeatedly because these operations are not performed like electric circuit but often mechanically done by relative movement between the readout means and the buffer memory 4.

Furthermore, a significant improvement in accuracy of reading and writing digital data to and from CD-Rs and other similar media in recent years has reduced the necessity of error correction by the error corrector. Nevertheless, the data in the head portions, which have been checked to contain no error, are often subjected to error detection by the error detector. Consequently, error correction and error detection, which could be processed in parallel in most cases, are processed separately in time, thereby wasting much time.

The error correction and the error detection are not satisfactory in consideration of probable higher densities and more rapid readout of DVDs and other recording media in the future.

In high-speed reproduction performed to check the position of specific image data or to inspect their contents, it is not always necessary to reproduce image data completely. On the other hand, it is usually necessary for data relating to the programs of the CPU to be reproduced in a perfect form even if it takes much time. Thus, error correction must be performed at different levels, which have not been satisfactorily done so far.

Hence, it has been expected to develop an error correction device which performs error correction more accurately and faster in accordance with required performance levels.

SUMMARY OF THE INVENTION

The present invention has been contrived to solve the aforementioned problems by paying attention to the following: (1) the data of code words up to and including the code word subjected to error correction do not change in the error correction by the error corrector; (2) as a result of (1), the efficiency of the transfer of these data to the error detector can be improved; (3) the error rate; and (4) the data amount of each code word. To be more specific, the present invention has the following structure.

The aspect 1 relates to an error correction device comprising: a buffer memory for storing at least one sector of data (recording data in such a manner as to be able to be read or overwritten) having a structure where each of N words (strings) of error correcting code comprises a data unit including original image or audio data (main data) etc., an inner code parity unit, and one error detecting code (data transfer between actual units are usually done one ECC at a time, but the processes in the present aspect can be done one sector at a time); a syndrome calculating means for generating the syndrome for error-contained data read from the buffer memory; an error correcting means for correcting error-containing data in the buffer memory by detecting an error position from the syndrome generated by the syndrome calculating means and by calculating an error value; an error detecting means for detecting an error in error-corrected data generated by the error correcting means; a storing means composed of a register with a high-speed writing and reading ability so as to store mid-term results of an error detecting process in the error detecting means; a bus control means for controlling data transfer between the buffer memory, the syndrome calculating means, the error correcting means, and the error detecting means (preventing a collision between the units in reading, overwriting and other processes); and a system control means for performing various processes for error correction in predetermined procedures a necessary number of times.

The bus control means transfers data from the buffer memory to the syndrome calculating means and to the error detecting means concurrently in code word units until the syndrome calculating means detects an error-containing code (the data transfer here includes a state where some data are left in the buffer memory. Not only in the present aspect but also in the other aspects, it is considered that some data are left there). When the syndrome calculating means detects an error-containing code, subsequent data in the buffer memory are transferred only to the syndrome calculating means in code word units. After not only the code word from which an error-containing code has been detected but also all the code words in the sector are corrected by the syndrome calculating means, error-corrected data that include the code word from which the error-containing code has been detected up to and including a final code word are read from the buffer memory and transferred to the error detecting means.

The error detecting means executes error detection in parallel with syndrome calculation done by the syndrome calculating means until the syndrome calculating means detects an error-containing code, while storing the mid-term results of the error detecting process to the storing means in code word units. After the syndrome calculating means detects an error-containing code, the error detecting process is suspended. Then, in the error detection for the data in and after the string from which the error has been detected, the error-corrected data are transferred from the buffer memory after the error correction done by the error correcting means, and error detection is restarted at a code word following the data stored in the storing means. Consequently, in the error detection done by the error detecting means after the error correction, data stored in the storing means are used as code words before an error-containing code is detected. Thus, the mid-term results of an error detecting process are used. This makes it possible to start an error detecting process at an halfway point after an error is detected and corrected, thereby greatly reducing the time required for error correction. As a result, the error correction device can cope with probable higher-speed data reading in the future.

Besides, the bus control means may perform various adjustments in order to write the error-corrected data to the buffer memory. When an error correcting process is not completed in one time, the system control means may execute error detection and error correction repeatedly in the horizontal direction and the vertical direction alternately, or data reading from a laser disk or the like may be done again by varying the reading speed. Components provided to realize these functions are well known and their description is omitted.

In the aspect 2, data reading from and writing to the buffer memory, and data transfer are done as DMA transfer. This greatly improves processing speed.

With recent high-density and high-performing ICs and CPUs, the provision of the system control unit facilitates the process and control of each unit, as compared with the process by mere circuits and connecting lines.

The aspect 3 relates to an error correction device comprising: a buffer memory for storing at least one sector of data having a structure where each of N strings of error correcting code comprises a data unit, an inner code parity unit, and one error detecting code; a syndrome calculating means for generating syndrome as an equation for error correction for data read from the buffer memory; an error correcting means for correcting error-containing data in the buffer memory by detecting an error position from the syndrome generated by the syndrome calculating means and by calculating an error value; an error detecting means for performing error detection repeatedly, one sector at a time, for error-corrected data generated by the error correcting means; a bus control means for controlling data transfer between the buffer memory, the syndrome calculating means, the error correcting means, and the error detecting means; and a system control means for performing various processes for error correction in predetermined procedures a necessary number of times.

The bus control means transfers data to be corrected from the buffer memory to the syndrome calculating means and to the error detecting means concurrently in code word units until the syndrome calculating means detects an error-containing code. Only when the syndrome calculating means has detected an error-containing code, after the error correction done by the error correcting means for not only the error but also the subsequent code words, error-corrected data in a sector containing data from which an error-containing code has been detected are transferred from the buffer memory to the error detecting means. The error detecting means executes error detection for a code word transmitted from the buffer memory, in parallel with the syndrome calculation done by the syndrome calculating means, and only when the syndrome calculating means has detected an error-correcting code, executes error detection one more time for the error-corrected data.

Consequently, when no error-containing code is detected from one sector by syndrome calculation, the subsequent error correcting process becomes unnecessary, which can greatly reduce the time required for error correction. Above all, recent improvements in manufacturing techniques and materials of CD-ROMs reduces the occurrence of minor blemishes due to manufacturing errors or inappropriate handling of users, so that few code words are subjected to error correction. As a result, the subsequent code words do not need to be processed in most cases, thereby increasing the effects of the present invention.

The aspect 4 provides the aspect 3 with the same actions and effects as those which the aspect 2 provides for the aspect 1.

The aspect 5 relates to an error correction device comprising: a buffer memory for storing at least one sector of data having a structure where each of N words of error correcting code comprises a data unit, an inner code parity unit, and one error detecting code; a syndrome calculating means for generating syndrome for data read from the buffer memory; an error correcting means for correcting error-containing data in the buffer memory by detecting an error position from the syndrome generated by the syndrome calculating means and by calculating an error value; an error detecting means for detecting an error, one sector at a time, in error-corrected data generated by the error correcting means; a storing means for storing mid-term results, in code word units, of an error detecting process in the error detecting means; a bus control means for controlling data transfer between the buffer memory, the syndrome calculating means, the error correcting means, and the error detecting means; and a system control means for performing various processes for error correction in predetermined procedures a necessary number of times.

The bus control means executes a first transfer where data to be corrected are transferred in code word units from the buffer memory concurrently to the syndrome calculating means and to the error detecting means until the syndrome calculating means detects an error-containing code. The bus control means suspends the first transfer when the syndrome calculating means has detected an error-containing code, and executes a second transfer where the error-corrected code word is transferred from the buffer memory to the error detecting means after the error correction done by the error correcting means for the code word including an error-containing code. After the completion of the second transfer, the first transfer for subsequent code words is resumed. This process is executed every time an error-containing code is detected.

The error detecting means, until the syndrome calculating means detects an error-containing code, executes a first error detection where error detection is performed for a code word transmitted from the buffer memory in parallel with the syndrome calculation done by the syndrome calculating means, while storing mid-term results of the error detection in code word units to the storing means. After the syndrome calculating means detects an error-containing code, the error detecting means executes error detection for code words whose errors have been detected and corrected by the error correcting means, and stores them in the next position in the storing means. After the completion of the error detection for the code words, the first error detection is resumed. These processes are repeated every time the syndrome calculating means detects an error-containing code.

Thus, by exclusively re-transferring the data of the code word from which an error-containing code is detected and corrected to the error detector, the sequential process of error-containing code detection, error correction, and error detection can be executed in parallel, thereby greatly reducing the time required for error correction.

The aspect 6 provides the aspect 5 with the same actions and effects as those which the aspect 2 provides for the aspect 1.

The aspect 7 relates to an error correction device comprising; a buffer memory for storing at least one ECC block of data (one ECC block is enough in the present aspect) having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction, for example, sector as a unit, are subjected to error correction a syndrome calculating means for generating syndrome for data read from the buffer memory; an error correcting means for correcting error-containing data in the buffer memory by detecting an error position from the syndrome generated by the syndrome calculating means and by calculating an error value; an error detecting means for detecting an error in error-corrected data generated by the error correcting means; a bus control means for controlling data transfer between the buffer memory, the syndrome calculating means, the error correcting means, and the error detecting means; and a system control means for performing various processes for error correction in predetermined procedures a necessary number of times.

In the system control means, a first-time error correction sub means reads data from the buffer memory in the same direction as calculation for an error detecting code as a first-time error correction; transfers the read data to the syndrome calculating means and to the error detecting means concurrently until the syndrome calculating means detects an error-containing code; makes the syndrome calculating means execute syndrome calculation and the error detecting means execute error detection in parallel; makes the error correcting means execute error correction when the syndrome calculating means has detected an error-containing code; and makes one or both of the syndrome calculating means and the error correcting means provide the system control means with information which designates a code word containing the error-containing code.

The even-numbered error correction sub means reads a code word in the different direction from a preceding odd-numbered error correction; transfers the code word to the syndrome calculating means and to the error detecting means concurrently until the syndrome calculating means detects an error-containing code; makes the syndrome calculating means execute syndrome calculation and the error detecting means execute error detection in parallel; makes the error correcting means execute error correction when the syndrome calculating means detects an error-containing code; and makes the error correcting means provide the system control means with information which designates the position of the error-containing code in an error correcting code word obtained in the error correction.

The non-error range designating sub means designates, one sector at a time, a range from which an error-containing code has not been detected at the odd-numbered error correction or the subsequent even-numbered error correction, based on the information that designates the code word including the error-containing code and the information that designates the position of the error-containing code in the error correcting code word.

The odd-numbered error correction sub means, as an odd-numbered error correction in the third-time or later error correction, provides concurrently the syndrome calculating means and the error detecting means with a code in the same direction as in the previous odd-numbered error correction except for a sector in one ECC block which has been designated by the non-error range designating sub means as the range from which an error-containing code has not been detected in and before the preceding even-numbered error correction until the syndrome calculating means detects an error-containing code; makes the syndrome calculating means execute syndrome calculation and the error detecting means execute error detection in parallel, while using the processing results of sectors whose results in previous error detection and correction have been corrected; makes the error correcting means execute error correction when the syndrome calculating means detects an error-containing code; and makes one of the syndrome calculating means and the error correcting means provide the system control means with information which designates the code word including the error-containing code.

The number-of-times control sub means repeats the odd-numbered error correction and the even-numbered error correction a predetermined number of times.

In the aspect 8, the number-of-times control sub means repeats the error correction three times at most because it would be meaningless to repeat error correction more than three times under the developed technology in the recent years. If error correction were not to be complete in three times, data might be read again at different speed, or correction algorithm might be changed. In case of image data, which are not adversely affected by minor noises, might be transferred downstream as they are, or data at the same position in the preceding scene might be used instead. In other aspects, the same process will be done if error correction is not complete after several times of correction.

In the aspect 9, the error correction device of the aspect 7 or 8 further comprising a storing means for storing mid-term results, in code word units, of each code word from which no error has been detected in the error detecting process done by the error detecting means until the syndrome calculating means detects an error-containing code.

The non-error range designating sub means is a non-error sector code word range designating sub means for designating, in code word units of a sector, a range from which an error-containing code has not been detected in the odd-numbered error correction or the subsequent even-numbered error correction, based on the information that designates the code word including the error-containing code and on the information that designates the position of the error-containing code in the error correcting code word in an ECC to be processed.

The odd-numbered error correction sub means is an odd-numbered error correction sub means with mid-term results for, in the third-time or later odd-numbered error correction, making the bus control means start a concurrent data transfer not at the head but at the code word of the sector from which an error-containing code has been detected, based on the information designated by the non-error sector code word range designating sub means; for making the syndrome calculating means start syndrome calculation at the code word; and for making the error detecting means start error detection at a code word somewhere in the middle of the sector by using contents stored in the storing means as an initial value.

In the aspect 10, in the error correction devices of the aspects 7 and 8 further comprising a sector-basis storing means for storing mid-term results, on a sector-by-sector basis, in code word units, of each code word from which no error has been detected in the error detecting process done by the error detecting means, until the syndrome calculating means detects an error-containing code. As a result, the same action as in the aspect 9 is done in code word units of each sector.

In the aspect 11, in the error correction devices of the aspects 7 and 8 further comprising a sector-group-basis storing means for storing m results, on a sector-group-by-sector-group-basis, in code word units, of each code word from which no error has been detected in the error detecting process done by the error detecting means until the syndrome calculating means detects an error-containing code. As a result, the same action as in the aspect 9 is done in code word units of each sector.

In the aspects 12–15, in the error correction devices of the aspects 1, 2, 5, 6, 7, and 8, error correction is performed in parallel (by means of so-called pipeline processing) for data in a plurality of ECC blocks each having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction, for example a sector as a unit, are subjected to the error correction.

The buffer memory is a plural-ECC-block-division buffer memory for storing a plurality of ECC blocks to be processed in parallel by assigning addresses either sequentially or like a circle conceptually in pipeline processing, and for reading data in the same manner.

The storing means for storing mid-term results of an error detecting process generated by the error detecting means is an ECC-block-division storing means for storing the plurality of ECC blocks on a block-by-block basis.

In the system control means, the means-basis ECC block pipeline processing notification sub means transmits one or more ECC blocks which have been subjected to error correction downstream; stores one or more ECC blocks to be processed next at a predetermined address such as the address of the ECC block transferred downstream by overwriting them in the plural-ECC-block-division buffer memory; and makes the storage known to the bus control means, the syndrome calculating means, the error detecting means, and the error correcting means. To be more specific, the table showing processing targets referred to by each means are re-written. Besides, in the downstream units, transferred ECC blocks may be rearranged in accordance with the original order.

The means-basis ECC block recognition sub means recognizes a data transfer from the bus control means to the syndrome calculating means, to the error detecting means, and to the error correcting means for error detection and error correction; recognizes the error correction done by the error correcting means; recognizes writing of error-corrected data to the plural-ECC-block-division buffer memory done by the bus control means; recognizes ECC blocks in process when the error detecting means stores mid-term results to the plural-ECC-block-division storing means, and selects ECC blocks to be processed.

The ECC block notification sub means in sub means-basis pipeline processing notifies the first error detecting sub means, the even-numbered error correction sub means, the odd-numbered error correction sub means, the number-of-times control sub means, and the DMA transfer instruction sub means contained in the system control means that the error-corrected ECC blocks have been transmitted downstream and new ECC blocks to be processed have been stored in the plural-ECC-block-division buffer memory, and further notifies these same sub means contained in the system control means of the ECC blocks which are in process therein.

In the aspects 16–19, in the error correction devices of aspects 1, 2, 5, 6, 7, 8, 9, 10, and 11, error correction is performed in parallel for a plurality of ECC blocks according to pipeline processing as follows.

The buffer memory is an ECC-block-basis buffer memory for storing and reading, on a block-by-block basis, ECC blocks to be processed in parallel.

The storing means for storing mid-term results of an error detecting process generated by the error detecting means is an ECC-block-and-code word-division storing means for storing ECC blocks in process on a block-by-block basis, and code words in each ECC block, in each sector, or in each sector group, on a string-by-string basis.

In the system control means, the means-basis ECC block pipeline processing notification sub means transmits ECC blocks which have been subjected to error correction downstream; stores ECC blocks to be processed next to the ECC-block-basis buffer memory; and makes the storage known to the bus control means, the syndrome calculating means, the error detecting means, and the error correcting means.

The means-basis ECC block code word recognition sub means selects code words of the ECC blocks to be processed, in accordance with the contents stored in the ECC-block-and-code word-division storing means, in controlling a data transfer from the bus control means to the syndrome calculating means, to the error detecting means, and to the error correcting means for error detection and error correction; in controlling the error correction done by the error correcting means; in controlling writing of error-corrected data to the ECC-block-basis buffer memory done by the bus control means; in storing mid-term results to the ECC-block-and-code word-division storing means by the error detecting means.

The ECC block code word recognition sub means in sub means-basis pipeline processing makes the first error detecting sub means, the even-numbered error correction sub means, the odd-numbered error correction sub means, the number-of-times control sub means, and the DMA transfer instruction sub means in case equipped in the system control means recognize that the error-corrected ECC blocks have been transmitted downstream and new ECC blocks to be processed have been stored in the ECC-block-basis buffer memory, and further makes these same sub means contained in the system control means recognize the ECC blocks and the code words which are to be processed therein.

In order to facilitate the pipeline processing and the use of the mid-term results of error detection, the system control means has a conceptual list of each ECC block, each sector and each code word in each ECC block to be processed.

While in the error correction devices of the aspects 1, 2, 5, 6, 7, 8, 9, 10, and 11, the pipeline processing of the aspects 12–15 makes data be stored in descending order of ECC blocks in the buffer memory and transmitted downstream block by block after error correction is done as a rule. In contrast, in the aspects 20–23, several ECC blocks are collectively stored in the buffer memory in descending order and collectively transmitted downstream after error correction.

The collective data transfer is useful, for example, in a video-on-demand system where image data are transmitted in extremely short time units in order to transmit the same movie or the like to as many viewers as possible approximately at the same time. To be more specific, error correction is executed scene by scene, and if complete error correction is impossible, the CPU can correct data of a scene by extrapolation with the data prior to and subsequent to the scene.

The collective data transfer is also useful when discrete data for one scene is subjected to error correction in high-speed reproduction for retrieval. In this case, it goes without saying that data for one scene are recognized in compliance with recording in CPU or the like or communication regulations (protocol)(for example, EOP signals).

In the error correction devices of the aspects 20–23, the mid-term results of previous error calculation are used in ECC units in and after the second time error correction. In contrast, in the aspects 24–27, the mid-term results are used in predetermined data units such as one sector at a time or one sector group at a time. Therefore, the aspects 24–27 provide the aspects 23–29 with the same advantages and effects that the aspects 16–19 provide to the aspects 12–15.

The aspect 28 relates to an error correction device which performs error correction for data in ECC blocks each having a structure where error correcting code words each comprising a data unit and a parity unit are arranged in vertical and horizontal directions so as to realize repeated error correction, and predetermined data composed of a predetermined number of code words in the vertical or horizontal direction (data in the horizontal direction are referred to as sector) are as one unit subjected to error correction, and which also perform syndrome calculation and error detection in parallel with a storage of demodulated codes in a buffer memory.

The first syndrome calculating means performs syndrome calculation of data in the buffer memory.

The first error detecting means pairs up with the first syndrome calculating means and performs error detection concurrently therewith.

The second syndrome calculating means performs syndrome calculation of demodulated codes without the buffer memory.

The second error detecting means pairs up with the second syndrome calculating means, and performs error detection concurrently therewith.

The storing means stores the right portions of mid-term results of calculations of the first error detecting means and the second error detecting means in descending order of code words and sectors.

The buffer memory parallel transfer means transfers data transmitted from upstream to the second syndrome calculating means and to the second error detecting means in parallel with storage of the data in the buffer memory until the second syndrome calculating means detects an error-containing code.

The error-detecting-means switch means provides the storing means with the mid-term results of the calculation by the second error detecting means of code words until the error-containing code is detected.

The error correcting means performs error correction after one of the first error detecting means and the second error detecting means detects an error-containing code word, so as to perform error correction of data in the buffer memory directly or indirectly.

The parallel transfer means transfers data stored in the buffer memory, starting at a code word which is not stored in the storing means to the first syndrome calculating means and to the first error detecting means, on and after the second-time error correction in the same direction, before the first syndrome calculating means detects an error-containing code.

The second-time onward detecting-processed data use means performs error detection of the subsequent code words by using the mid-term results stored in the storing means, on and after the second-time error detection in the same direction done by the second error detecting means.

While the results of previous calculation are used in ECC units in and after the second-time error correction in the aspect 28, it is done in predetermined data units such as one sector at a time or one sector group at a time in the aspect 29. Therefore, the aspect 29 has the same advantages as those which the aspects 24–27 provide for the aspects 20–23.

The aspect 30 is a combination of the aspects 20–23 or the aspects 24–27 and the aspect 28 or 29. Therefore, demodulated data are subjected to error correction before being stored in the buffer memory, and the data stored in the buffer memory are subjected to error correction in pipeline processing. Furthermore, the mid-term results in the previous error calculation are used either one ECC, one sector, or one sector group at a time.

Therefore, the syndrome calculating means or the error calculating means, which directly executes syndrome calculation of demodulated data, executes syndrome calculation of the data in the buffer memory after all of the demodulated predetermined data are stored in the buffer memory. This further increases the speed of error calculation, and is useful to execute a high-speed processing of data stored in media that have been under poor storage conditions for a long time period.

In the aspects 31–50, there are two buffer memories, and when data in one buffer memory are subjected to error correction, a predetermined amount of data such as in subsequent sectors or in ECC block units are written to the other buffer memory. While the error-corrected data are read from one buffer memory in order to be transmitted downstream, subsequent data in the other buffer memory are already subjected to error correction. For this, the accessed buffer memory switch means directs the buffer memory to be accessed to the bus control means and the system control means. As a result, the effects of high-speed error correction with the mid-term results are exerted more effectively.

When it is difficult to provide error correction for the data read and demodulated at normal speed, in a device where reading is done again by varying the speed, the data in the same sector as the sector whose data are read again are stored in place of or after the data of the subsequent sector, and in the former case, the data are subjected to error correction later, and in the latter case, these data are replaced after error correction.

The alternating switch between two buffer memories and one-sector shifting of data in reading them again are not hard techniques in terms of programs, circuits, or hardware, so that their description will be omitted.

BRIEF DESCRIPTION OF THE DRAWINGS

FIGS. 21A and 21B conceptually show the reference tables stored and managed by the control unit in the error correction device of the embodiment in order to facilitate pipeline processing.

DESCRIPTION OF THE PREFERRED EMBODIMENTS

The present invention will be described as follows based on its embodiments.

Embodiment 1

The present embodiment differs from the prior art in that a mid-term result register is provided and that an error-containing code detection signal and an error-containing code word signal are entered to the system control unit from the syndrome calculator.

Figure 5:
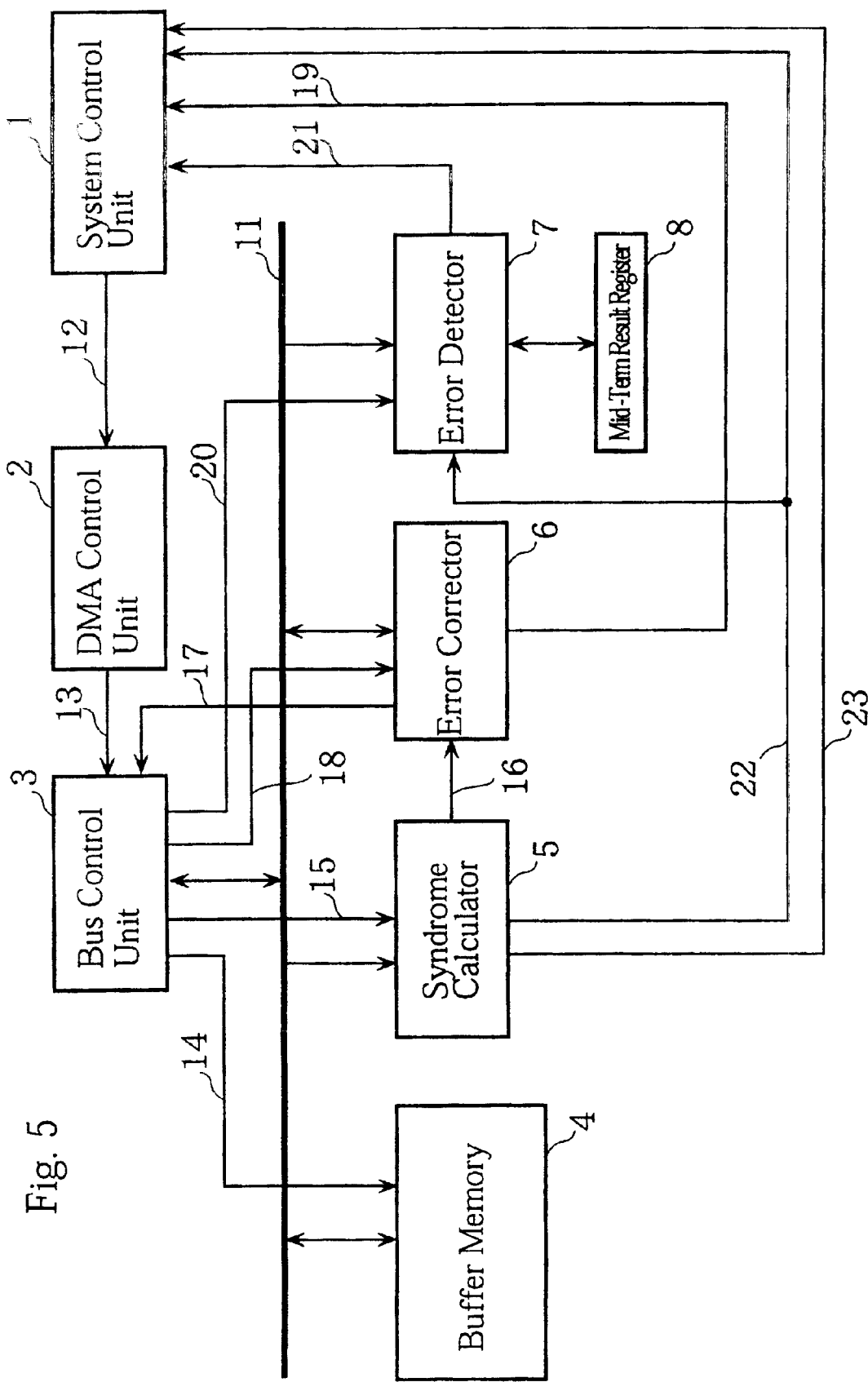
FIG. 5 shows the structure (block diagram) of the error correction device of Embodiment 1 of the present invention.

FIG. 5 shows the structure of the error correction device of the present embodiment. In the device, the system control unit 1, the DMA control unit 2, the bus control unit 3, the buffer memory 4, the syndrome calculator 5, the error corrector 6, and the error detector 7, which are basically identical to the components in the prior art, are referred to with the same reference numbers. (In the present and the following embodiments, the identical components are referred to with the same reference numbers unless they must be distinguished. This holds true for signals).

The same as in the prior art device, the bus control device 3, the buffer memory 4, the syndrome calculator 5, the error corrector 6, and the error detector 7 are connected via the data bus 11.

The DMA command 12, the DMA request 13, the buffer memory access signal 14, the syndrome supply signal 15, the syndrome 16, the access request signal 17, the error corrector access signal 18, the correction completion signal 19, the error detector data supply signal 20, and the error detection signal 21 are also basically identical to those in the prior art device, so they are referred to with the same reference numbers.

The mid-term result register 8, which is connected with the error detector 7, stores the mid-term results of the error detecting process done in the error detector 7. The error-containing code detection signal 22, which indicates that an error-containing code word has been detected by the syndrome calculator 5, is transmitted to the system control unit 1 and to the error detector 7. The error-containing code word signal 23, which indicates in which code word the error is detected by the syndrome calculator 5, is transmitted to the system control unit 1.

The behavior of the error correction device thus structured will be described as follows, with reference to FIG. 6.

Figure 6:
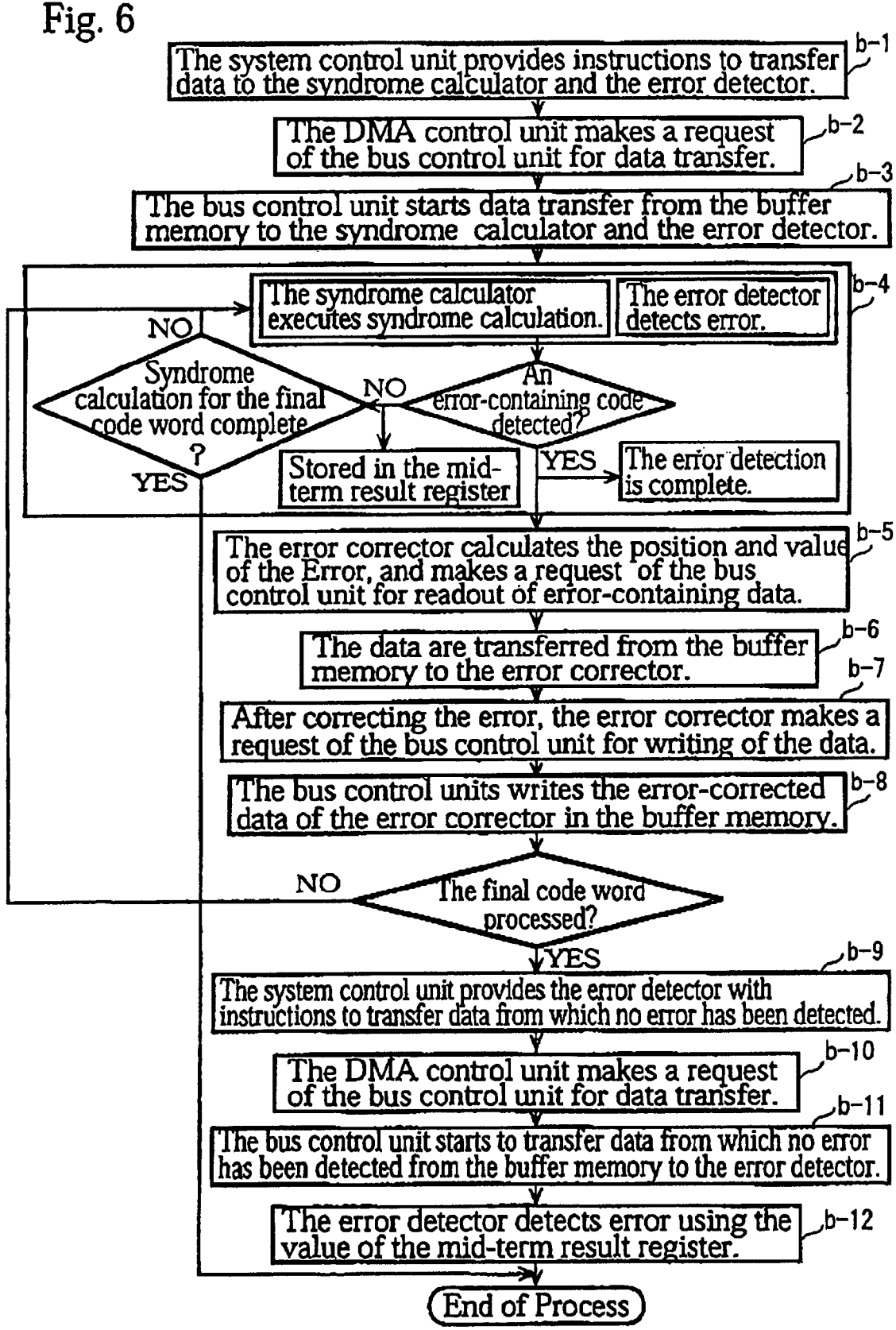
FIG. 6 shows the procedure of the processing of the error correction device.

FIG. 6 shows the procedure of horizontal error correction in one sector.

Step (b-1): the same process as at step (a-1) in the prior art is performed except that not only the syndrome calculator 5 but also the error detector 7 are provided with instructions to transfer data.

Step (b-2): the DMA control unit 2 outputs the DMA request 13 to the bus control unit 3 so as to request the data transfer from the buffer memory 4 to the syndrome calculator 5 and to the error detector 7.

Step (b-3): the bus control unit 3 puts the data bus 11 in commission, and outputs the buffer memory access signal 14 to the buffer memory 4 to read the data therefrom. The bus control unit 3 then outputs the syndrome data supply signal 15 and the error detector data supply signal 20 to the syndrome calculator 5 and the error detector 7, respectively, so as to supply the data read from the buffer memory 4 to the syndrome calculator 5 and to the error detector 7.

Step (b-4): the syndrome calculator 5 performs error-containing code detection for every transferred code word, and outputs the syndrome 16 to the error corrector 6. When an error-containing code word is detected, the syndrome calculator 5 outputs the error-containing code detection signal 22 to the error detector 7 and the system control unit 1, and also provides the system control unit 1 with the error-containing code word signal 23 indicating from which code word the error has been detected.

On the other hand, the error detector 7 also executes an error detecting process every code word. Only when the detection of an error-containing code is not informed by the error-containing code detection signal 22, the error detector 7 stores the mid-term results of the error detection in every code word to the mid-term result register 8 whose response is quicker than memory. When the detection of the error-containing code has been informed, the error detector 7 does not perform error detection for the subsequent code words including the code word informed.

Step (b-5): the same process as at step (a-5) is performed.

Step (b-6): after putting the data bus 11 in commission, the bus control unit 3 outputs the buffer memory access signal 14 to the buffer memory 4 to read error-containing data therefrom. Then, the bus control unit 3 outputs the error corrector access signal 18 to the error corrector 6 to supply the data thereto.

Step (b-7): the same process as at step (a-7) is performed.

Step (b-8): after putting the data bus 11 in commission, the bus control unit 3 reads the error-corrected data from the error corrector 6 and overwrites the data in the buffer memory 4. When error correction for one sector is complete, the error corrector 6 transmits the correction completion signal 19 to the system control unit 1.

The above step (b-4) is executed in parallel with steps (b-5) through (b-8) like a pipeline.

Step (b-9): in order to check to see that the corrected data contain no more error, the system control unit 1 transmits the DMA command 12 to the DMA control unit 2 so as to provide instructions to transfer the data from the buffer memory 4 to the error detector 7. The system control unit 1 make the data transfer be started from the code word indicated by the error-containing code word signal 23 outputted at the same time as the error-containing code detection signal 22 first outputted from the syndrome calculator 5 at step (b-4).

Step (b-10): the same process as at step (a-10) is performed.

Step (b-11): after putting the data bus 11 in commission, the bus control unit 3 outputs the buffer memory access signal 14 to the buffer memory 4 to read the data therefrom. Then, the bus control unit 3 outputs the error detector data supply signal 20 to the error detector 7 so as to supply the data read from the buffer memory 4.

Step (b-12): while using the mid-term results of error correction stored in the mid-term result register 8 as the initial value, the error detector 7 executes error detection for the transferred subsequent data, and informs the system control unit 1 of the presence or the absence of an error by transmitting the error detection signal 21.

When an error-containing code is not detected in the syndrome calculator 5 at step (b-4), the error correcting operations between steps (b-5) and (b-8) are performed in parallel with step (b-4) for code words in descending order of stream; however, error correction for the data on the buffer memory 4 is not performed because an error-containing code has not been detected. The error detecting process done by the error detector 7 is complete at step (b-4), and the error detection signal 21 is transmitted to the system control unit 1 so as to indicate whether an error has been detected or not. In this case, steps (b-9) through (b-12) are not executed. Through these steps, the horizontal error correction for one sector is complete. In the same manner, horizontal error correction for the subsequent 15 sectors is executed so as to complete the horizontal error correction for one block. If no error is detected from all sectors, the error correcting operation is complete; if there is an error detected even from one sector, the next process including vertical error correction will be executed.

As described hereinbefore, in the present embodiment, data are transferred from the buffer memory 4 not only to the syndrome calculator 5 but also to the error detector 7 at the same time, and until an error-containing code is detected by the syndrome calculator 5, error detection in the error detector 7 is executed concurrently with syndrome calculation. In the error detection performed after the error correction of the error corrector 6, the mid-term results of the error detection before the detection of the error-containing code transmitted to and stored in the mid-term result register 8 are used. This eliminates the need for all data to be transferred from the buffer memory 4 to the error detector 7. In addition, the error detecting process can start at a halfway point. Hence, the time required for error correction can be greatly reduced.

To be more specific, when the error rate is 0.05%, 2048-byte main data contain one error on the average, which means that the error is likely to arise around the central code word on the average of 12 code words in the horizontal direction. Therefore, the mid-term results register 8 has the first 6 code words, and only the remaining 6 code words can be transferred after error correction. Thus, the time required for error detection is also reduced approximately in half.

Embodiment 2

The present embodiment differs from the prior art in that the syndrome calculator 5 provides the system control unit 1 with an error-containing code sector detection signal 22, which indicates that an error-containing code word has been detected from the sector.

Figure 7:
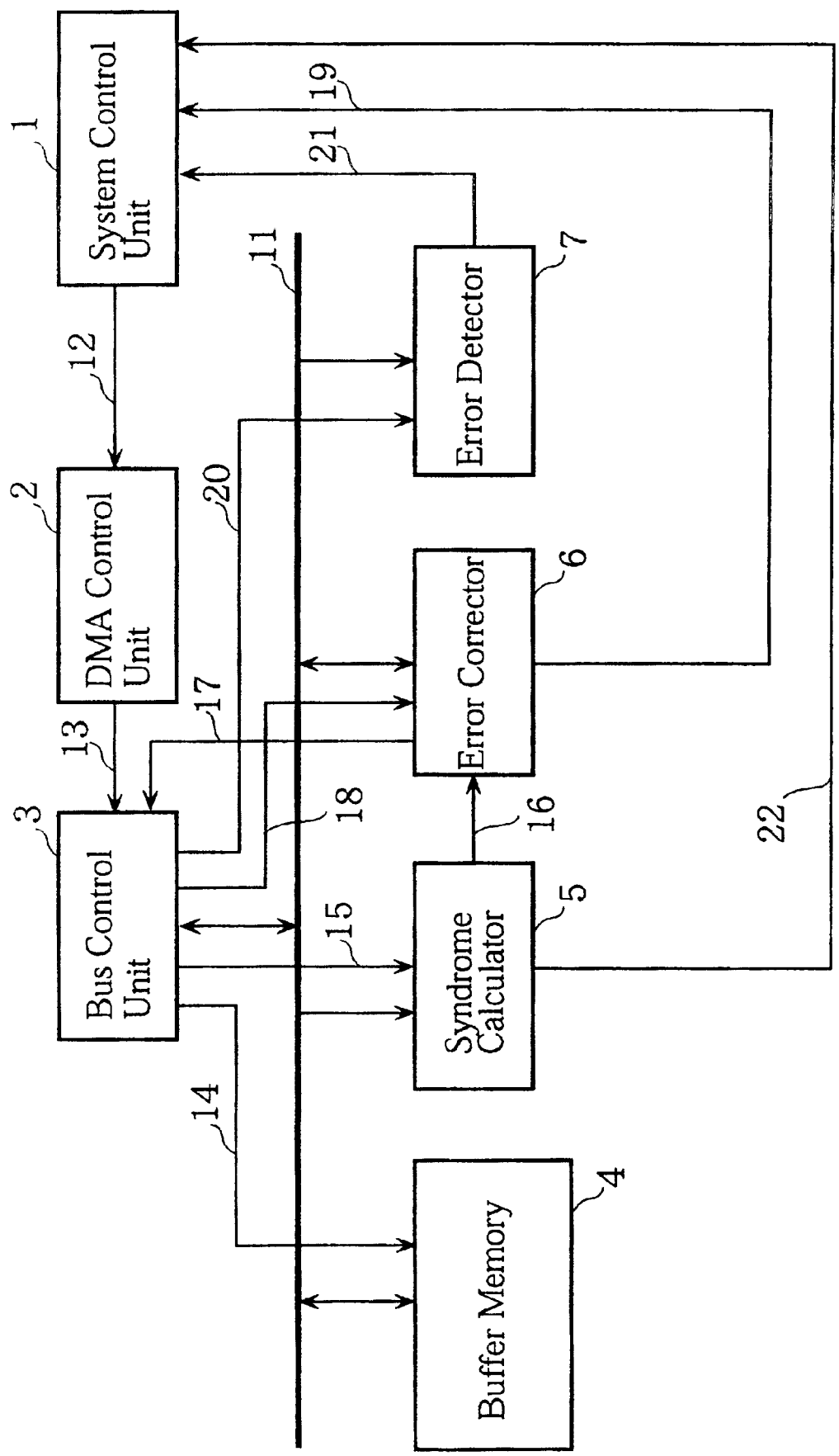
FIG. 7 shows the structure of the error correction device of Embodiment 2 of the present invention.

FIG. 7 shows the structure of the error correction device of the present embodiment.

Figure 8:
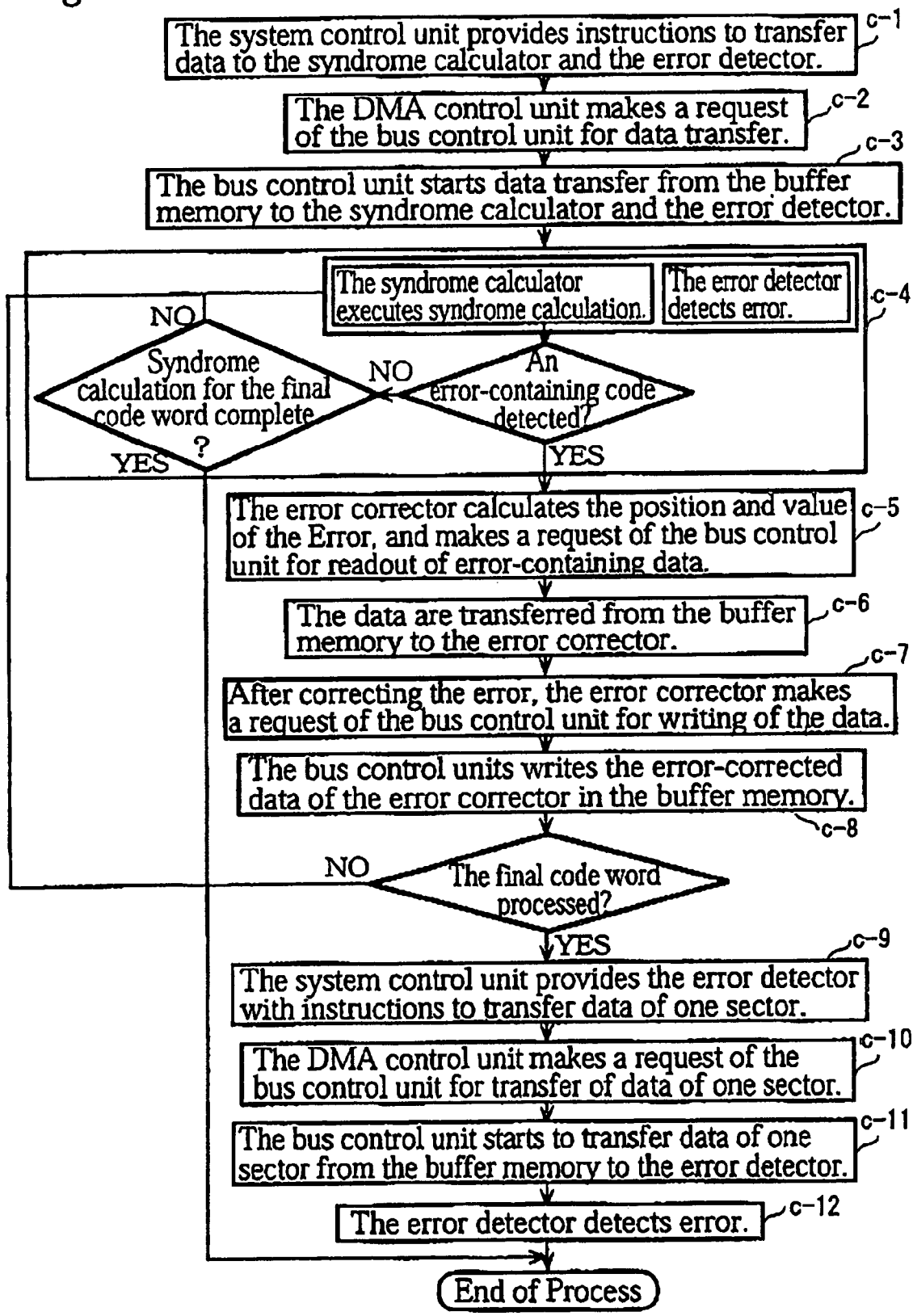
FIG. 8 show the procedure of the processing of the error correction device.

The behavior of the error correction device of the present embodiment will be described as follows with reference to the procedure of horizontal error correction in one sector shown in FIG. 8.

Step (c-1): the same process as at step (b-1) in Embodiment 1 is performed.

Step (c-2): the DMA control unit 2 outputs the DMA request 13 to the bus control unit 3 so as to request the data transfer from the buffer memory 4 to the syndrome calculator 5 and to the error detector 7.

Step (c-3): the bus control unit 3 puts the data bus 11 in commission, and outputs the buffer memory access signal 14 to the buffer memory 4. The bus control unit 3 then outputs the syndrome data supply signal 15 and the error detector data supply signal 20 to the syndrome calculator 5 and the error detector 7, respectively, so as to supply the data read from the buffer memory 4 to the syndrome calculator 5 and to the error detector 7 (same as at step (b-3) in the first embodiment).

Step (c-4): the syndrome calculator 5 performs error-containing-code detection every transferred code word, and outputs the syndrome 16 to the error corrector 6. When an error-containing code word is detected in one sector, the syndrome calculator 5 outputs the error-containing code sector detection signal 22 to the system control unit 1. On the other hand, the error detector 7 also executes an error detecting process for the data transferred.

Step (c-5): the same process as at step (a-5) of the prior art is performed.

Step (c-6): after putting the data bus 11 in commission, the bus control unit 3 outputs the buffer memory access signal 14 to the buffer memory 4 to read data therefrom. Then, the bus control unit 3 outputs the error corrector access signal 18 to the error corrector 6 to supply the data read from the buffer memory 4 thereto.

Step (c-7): the same process as at step (a-7) in the prior art is performed.

Step (c-8): the same process as at step (b-8) in the first embodiment is performed.

Step (c-4) is executed in parallel with steps (c-5) through (c-8) like a pipeline.

Step (c-9): the same process as at step (a-9) in the prior art is performed.

Step (c-10): the same process as at step (a-10) in the prior art is performed.

Step (c-11): the same process as at step (b-11) in the first embodiment is performed.

Step (c-12): the same process as at step (a-12) in the prior art is performed.

When an error-containing code is not detected in one sector by the syndrome calculator 5 at step (c-4), the error correcting operations between steps (c-5) and (c-8) are performed in parallel with the operation at step (c-4); however, error correction for the data on the buffer memory 4 is not performed because an error-containing code has not been detected.

The error detecting process done by the error detector 7 is complete at step (c-4), and the error detection signal 111 is transmitted to the system control unit 1 so as to inform whether an error has been detected or not. In this case, steps (c-9) through (c-12) are not executed.

Through these steps, the horizontal error correction for one sector is complete. In the same manner, horizontal error correction for the subsequent 15 sectors is executed so as to complete the horizontal error correction for one block. If no error is detected from all sectors, the error correcting operation is complete; if there is an error detected even from one sector, the next process including vertical error correction will be executed.

As described hereinbefore, in the present embodiment, data are transferred from the buffer memory 4 not only to the syndrome calculator 5 but also to the error detector 7 at the same time, and the error detector 7 executes error detection concurrently with syndrome calculation. If an error-containing code is not detected in one sector in the syndrome calculation, the subsequent operations become unnecessary, which greatly reduces the time required for error correction. Hence, the present invention will become more significant when probable technological development in the future reduces the error rate.

Unlike Embodiment 1, the mid-term result register 8, which is more expensive than memory, becomes unnecessary.

Embodiment 3

The present embodiment differs from the prior art in that the syndrome calculator 5 outputs the error-containing code detection signal 22, which indicates that an error-containing code word has been detected, to the DMA control unit 2 and to the error detector 7; the error corrector 6 outputs the error-containing code word signal 23 to the DMA control unit 2 and to the error detector 7; and that the mid-term result register 8 is provided.

Figure 9:
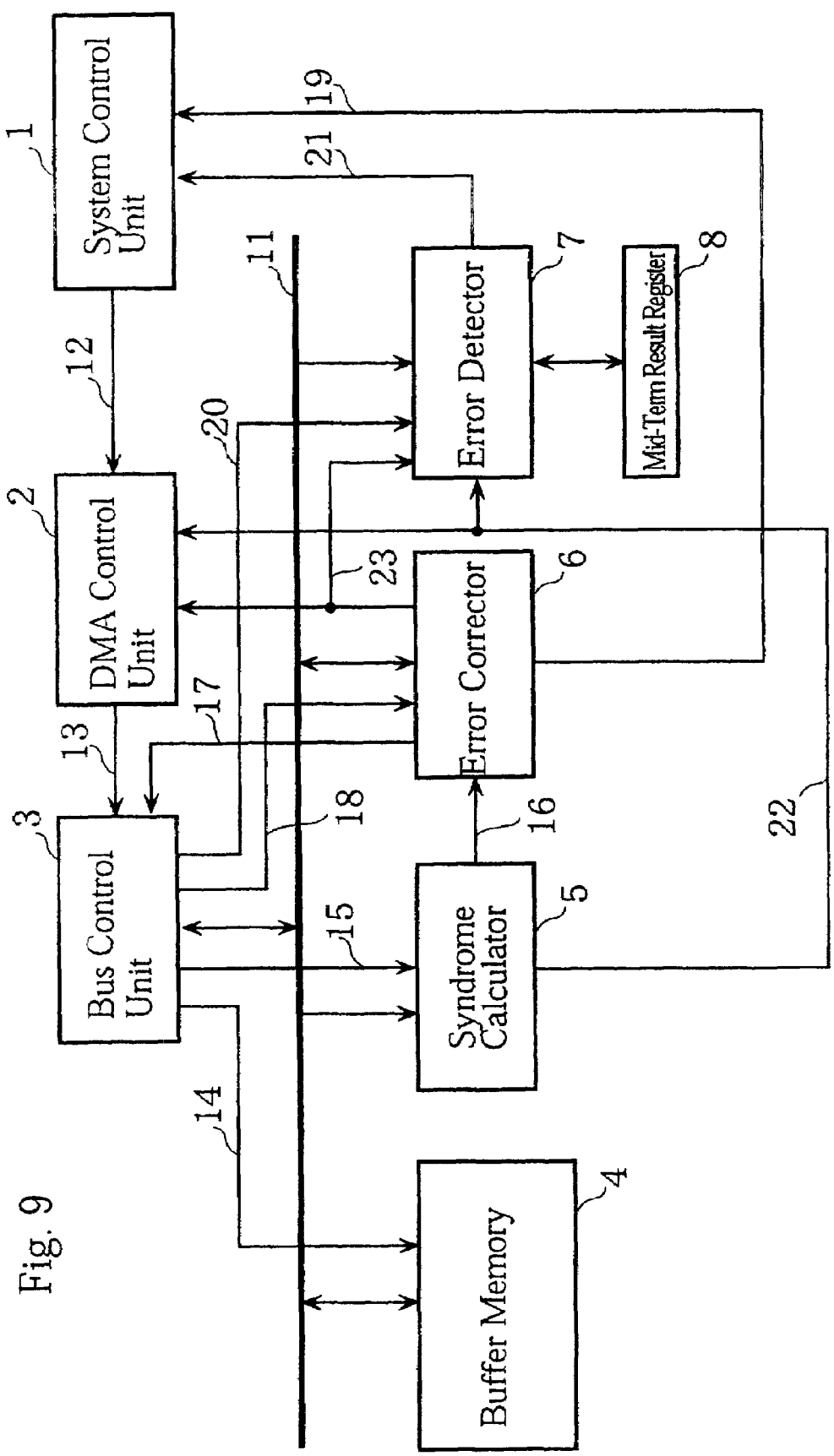
FIG. 9 shows the structure of the error correction device of Embodiment 3 of the present invention.

FIG. 9 shows the structure of the error correction device of the present embodiment.

In FIG. 9, in response to the output of the error-containing code detection signal 22, the error detector 7 suspends an error detecting process, and the DMA control unit 2 suspends a data transfer from the buffer memory 4 to the syndrome calculator 5. The error corrector 6 outputs an one-code word error correction completion signal 23 when it completes error correction for one code word.

Figure 10:
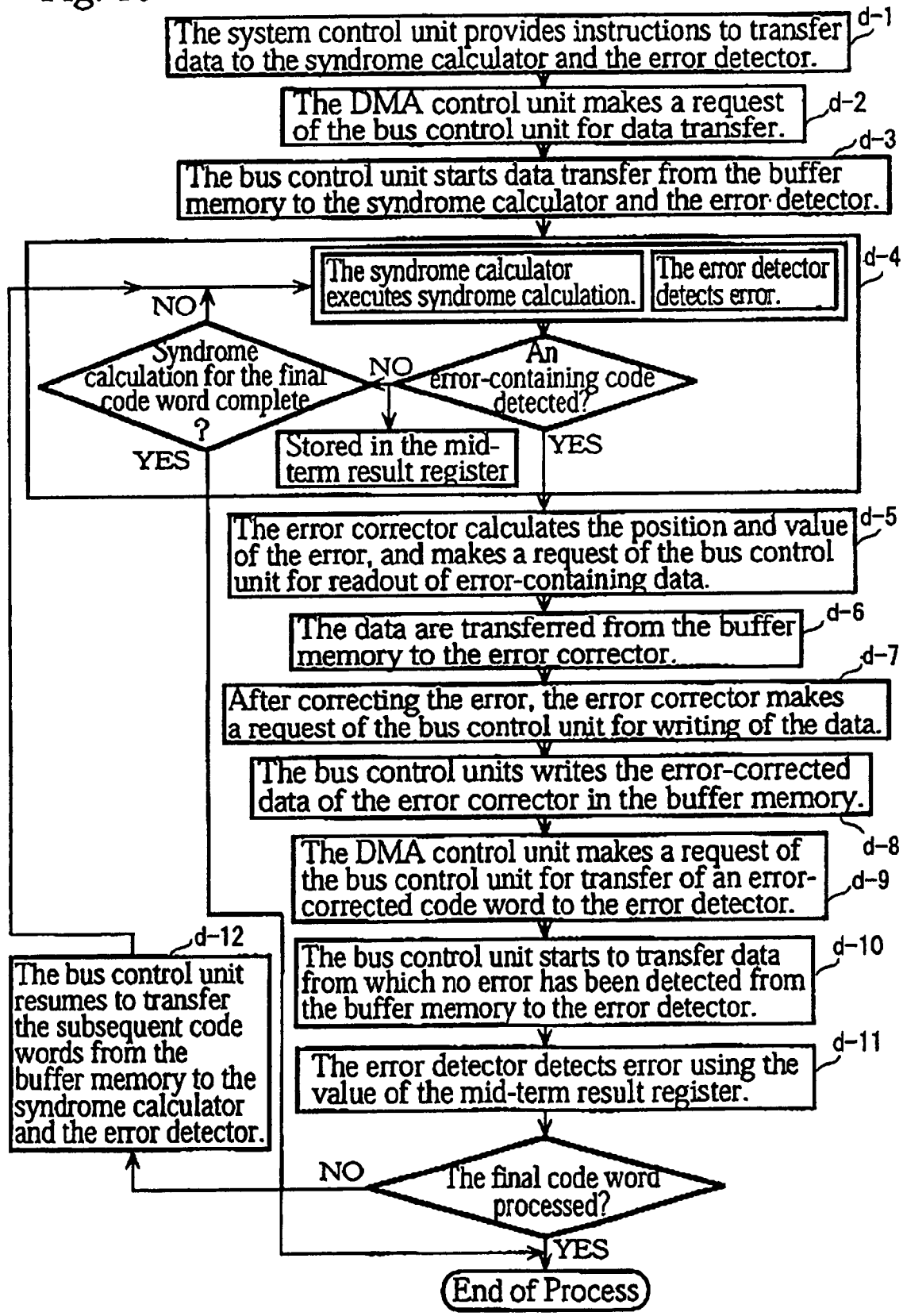
FIG. 10 shows the procedure of the processing of the error correction device.

FIG. 10 shows the procedure of horizontal error correction in one sector of the error correction device of the present embodiment.

The behavior of the error correction device will be described as follows with reference to FIG. 10.

Step (d-1): the same process as at step (c-1) of Embodiment 2 is performed.

Step (d-2): the same process as at step (c-2) of Embodiment 2 is performed.

Step (d-3): the same process as at step (b-3) of Embodiment 1 is performed.

Step (d-4) the syndrome calculator 5 performs error-containing code detection for every transferred code word, and outputs the syndrome 16 to the error corrector 6. When an error containing code word is detected, the syndrome calculator 5 outputs the error-containing code detection signal 22 to the error detector 7 and to the DMA control unit 2. On the other hand, the error detector 7 also executes error detection for each code word. Only when the error-containing code detection signal 22 has not been outputted, the mid-term results of error detection for each code word are stored in the mid-term result register 8. When the detection of error-containing code has been informed by the error-containing code detection signal 22, the error detector 7 suspends an error detecting process. At the same time, the syndrome calculator 5 informs the DMA control unit 2 of the detection of an error-containing code. The DMA control unit 2 suspends an output of the DMA request 13 to the bus control unit 3. The bus control unit 3 suspends a data transfer from the buffer memory 4 to the syndrome calculator 5.

Step (d-5): the same process as at step (a-5) in the prior art is performed.

Step (d-6): the same process as at step (b-6) in the first embodiment is performed.

Step (d-7): the same process as at step (a-7) in the prior art is performed.

Step (d-8): after putting the data bus 11 in commission, the bus control unit 3 reads the error-corrected data from the error corrector 6 and overwrites the data in the buffer memory 4. When error correction for one code word is complete, the error corrector 6 transmits the one-code word error correction completion signal 23 to the DMA control unit 2 and to the error detector 7.

Step (d-9): in response to the output of the one-code word error correction completion signal 23, the DMA control unit 2 outputs the DMA request 13 to the bus control unit 3 so as to request the transfer of the error-corrected code word from the buffer memory 4 to the error corrector 7.

Step (d-10): after putting the data bus 11 in commission, the bus control unit 3 outputs the buffer memory access signal 14 to the buffer memory 4 to read the data therefrom. Then, the bus control unit 3 outputs the error detector data supply signal 20 to the error detector 7 so as to supply the data read from the buffer memory 4.

Step (d-11): while using the mid-term results of error correction stored in the mid-term result register 8, the error detector 7 executes error detection for the transferred subsequent data up to and including the final code word.

Step (d-12): upon completion of the DMA transfer to the error detector 7, the DMA control unit 2 resumes the output of the DMA request 13 transferring the subsequent code words to the syndrome calculator 5 and to the error detector 7. The bus control unit 3 executes a data transfer from the buffer memory 4 to the syndrome calculator 5 and to the error detector 7.

The operations at steps (d-4) through (d-12) are repeated until error correction for one sector is complete.

When the error correction for one sector is complete, the error corrector 6 outputs the error correction completion signal 19 to the system control unit 1, and the error detector 7 informs the system control unit 1 whether an error has been detected or not by transmitting the error detection signal 21.

When an error-containing code has not been detected in the syndrome calculator 5 at step (d-4), the error correcting operations between steps (d-5) and (d-8) are executed concurrently with the operation at step (d-4); however, the error correcting operation for data on the buffer memory 4 and the DMA transfer are not suspended because an error-containing code has not been detected. The error detection of the error detector 7 is complete at step (d-4), and it is informed to the system control unit 1 by transmitting the error detection signal 21 that no error has been detected. In this case, steps (d-9) through (d-12) are not executed.

Through these steps, horizontal error correction for one sector is complete. In the same manner, horizontal error correction is executed for the subsequent 15 sectors so as to complete the horizontal error correction for one block. If no error is detected from all sectors, the error correcting operation is complete; if there is an error detected even from one sector, the next process including vertical error correction will be executed.

As described hereinbefore, in the present embodiment, data are transferred from the buffer memory 4 not only to the syndrome calculator 5 but also to the error detector 7 at the same time, and until the syndrome calculator 5 detects an error-containing code, the error detector 7 executes error detection concurrently with syndrome calculation. If an error-containing code is detected by the syndrome calculator 5, the syndrome calculation is suspended, and the error-containing code is corrected by the error corrector 6. Then, the data are transferred to the error detector 7 so as to be subjected to error detection. After the error detection, the subsequent code words are transferred to the syndrome calculator 5 and to the error detector 7 where syndrome calculation and error detection are executed in parallel.

Thus, when an error-containing code word has been detected, the error-corrected data of the code word can be exclusively re-transferred to the error detector 7 so as to execute a series of processes including error-containing code detection, error correction, and error detection in parallel, thereby greatly reducing the time required for error correction.

Embodiment 4

The present embodiment provides two buffer memories in order to reduce the time required for reading and writing data; while data are being read from or written to one of the buffer memories, data in the other buffer memory are subjected to error correction.

Figure 11:
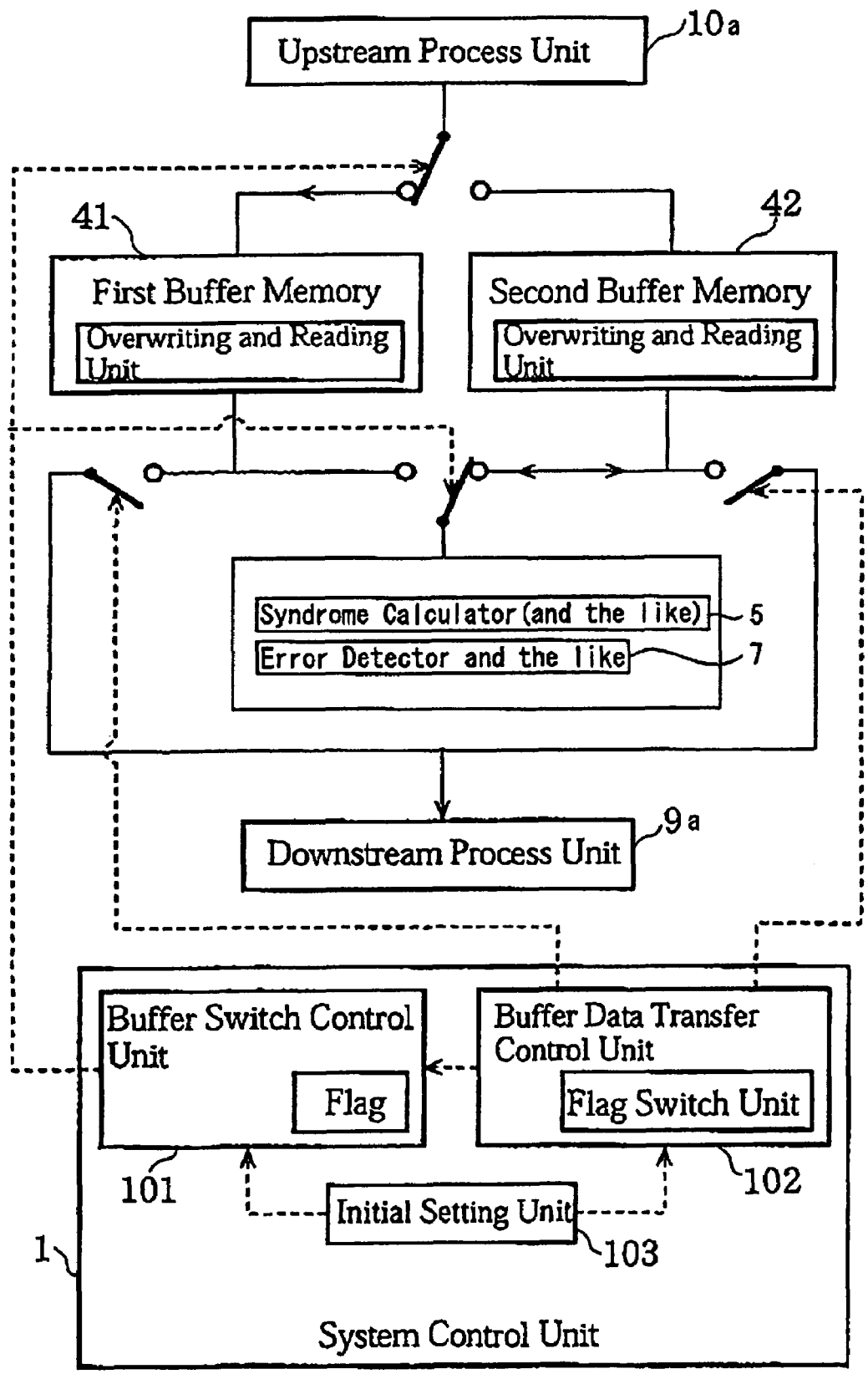
FIG. 11 shows the structure of the error correction device of Embodiment 4 of the present invention.

The structure of the main part of the error correction device of the present invention is shown in FIG. 11. The error correction device comprises a downstream processing unit 9 composed of a transfer control device and the like, an upstream processing unit 10 composed of a demodulator and the like, a first buffer memory 41 provided with an overwrite unit and a readout unit, and a second buffer memory 42 provided with an overwrite unit and a readout unit. The device further comprises a buffer switch control unit 101, a buffer data transfer control unit 102, and an initial setting unit 103 which are arranged in the system control unit 1. The solid lines indicate the flow of digital data, and the dot lines indicate the flow of control signals.

The action of each unit will be described as follows.

When error correction begins, the initial setting unit 103 writes the data of the first sector to the first buffer memory 41 and the data of the second sector to the second buffer memory 42. The initial setting unit 103 also sets the flag in the buffer switch control unit 101 at 1, and provides the buffer switch control unit 101 and the buffer data transfer control unit 102 with instructions for the setting.

The buffer switch control unit 101, when the error correction begins, refers to the flag, and connects the first buffer memory 41 with the syndrome calculator 5, the error detector 7, and the like. As the error correction proceeds, the buffer switch control unit 101 refers to the flag every time it receives a transfer signal from the buffer data transfer control unit 102 to switch the buffer memories, and write data received from the upstream processing unit 10 to the corresponding buffer memory every time the flag is switched.

Every time error correction for one sector is complete, the buffer data transfer control unit 102 switches circuits so as to transfer data either in the first buffer memory 41 or the second buffer memory 42 to the downstream processing unit 9; transmits a transfer signal to the buffer switch control unit 101 at the same time; and makes the flag switch unit set the flag between at 1 and at 2 alternately.

When the error correction for one sector is complete, the data in the buffer memory that has been in process is flown to the downstream processing unit 9. On the other hand, the data to be subjected to the next error correction are already written in the other buffer memory by the buffer switch control unit 101, which quickens error correction.

Embodiment 5

While in Embodiments 1 to 3, the mid-term result register 8 is shared by all sectors, in the present embodiment each of the 16 sectors of one ECC block is provided with a mid-term result register, considering that data are often transferred in one-ECC increments in the actual error correction, which may include vertical error correction.

Figure 12:
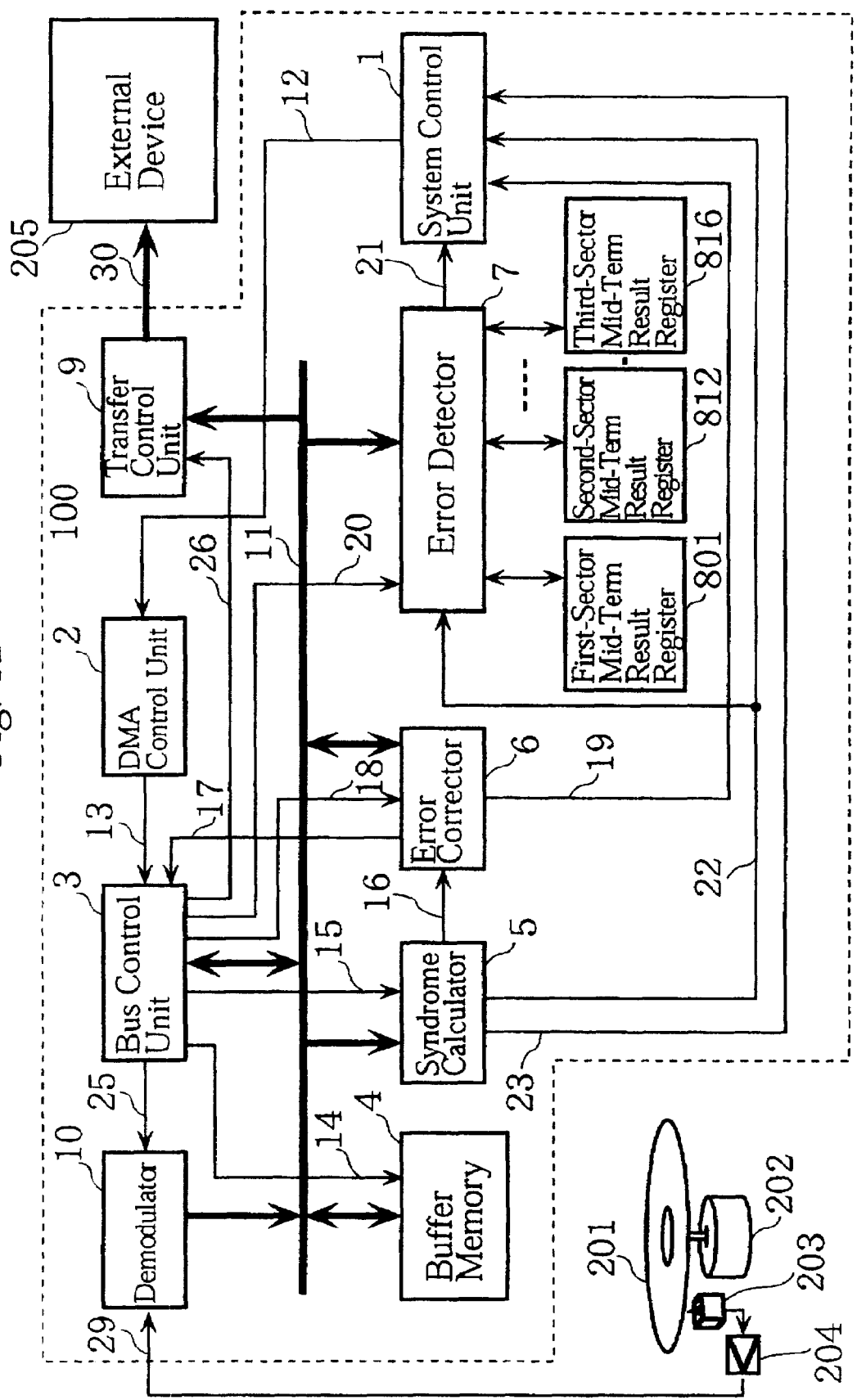
FIG. 12 shows the structure of the error correction device of Embodiment 5 of the present invention.

FIG. 12 shows the structure of the error correction device 100 of the present embodiment. In FIG. 12, an optical disk 201 is driven by a spindle motor 202, and an optical head 203 reads data stored in the optical disk 201 and outputs them to an amplifier 204. An reception code 29 is read out in the same direction as the horizontal (inner code) error correction and entered to the error correction device 100. In the device 100, the reception code 29 is entered to a demodulator 10 and the demodulated code is stored in the buffer memory 4 by a demodulation code enter signal 25 outputted from the bus control unit 3.

A transfer control unit 9 transmits an error-corrected code 30 read from the buffer memory 4 to an external unit 205 such as a personal computer. The data transfer to the external unit 205 is performed by the buffer memory access signal 14 and a demodulation code enter signal 25, which are outputted by the bus control unit 3.

As shown in FIG. 12, the error detector 7 is provided with 16 mid-term result registers 801, 802, . . . 816 for 16 sectors in one ECC block.

Figure 13:
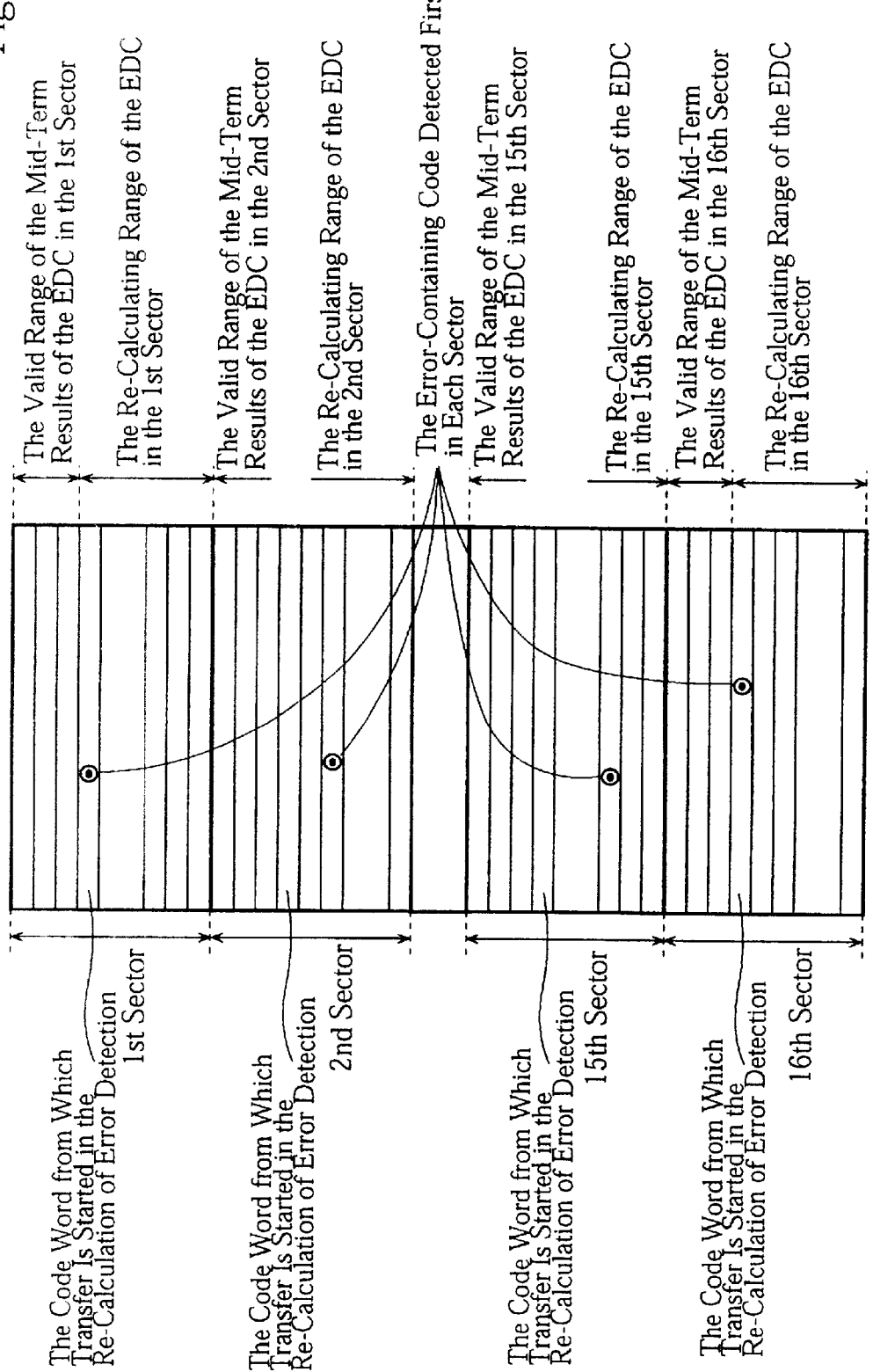
FIG. 13 explains the error-containing codes and the data transfer range of the error correction device of the embodiment.

FIG. 13 shows error-containing codes in the sectors and the data transfer range in error detection of the present embodiment.

Figure 14:
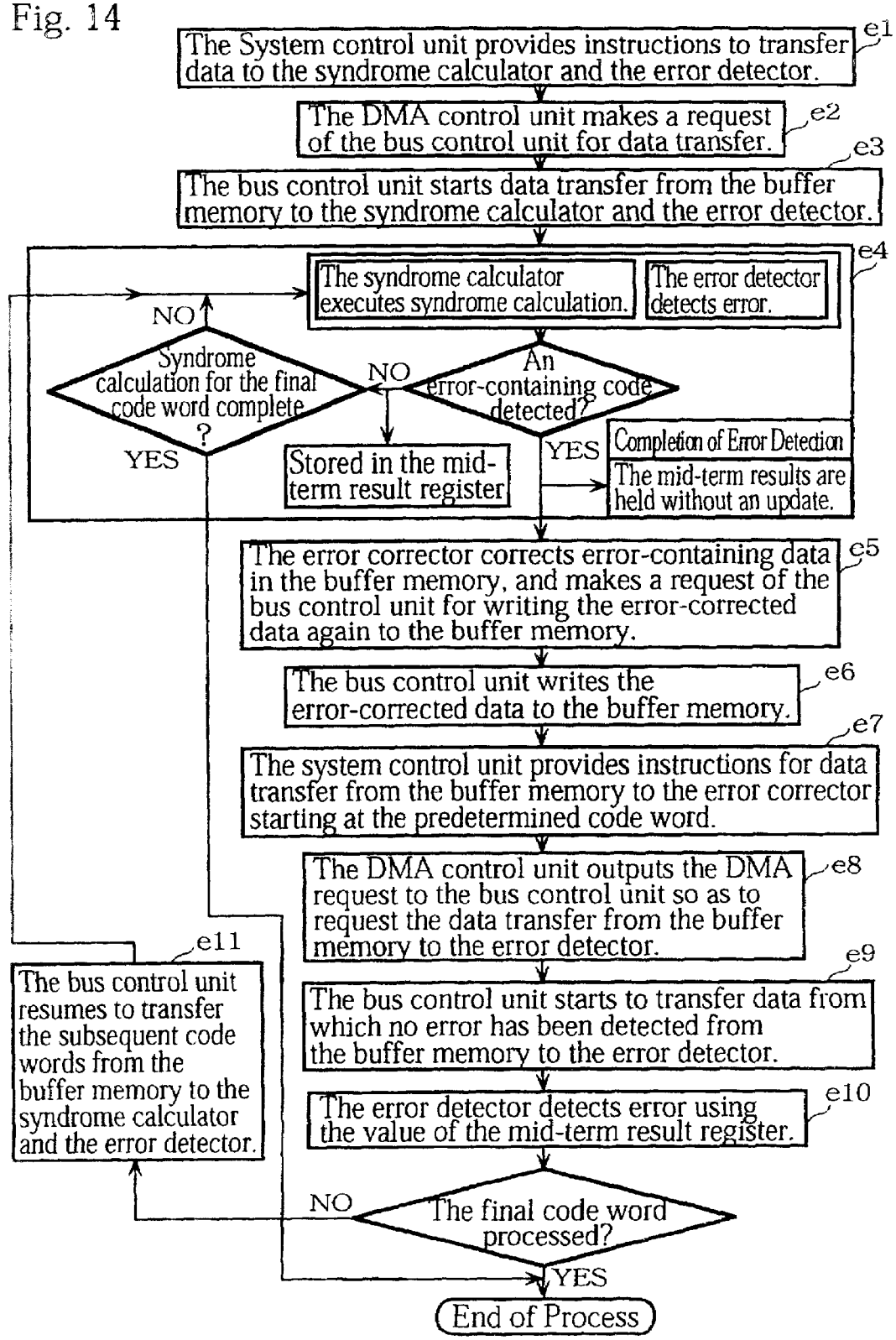
FIG. 14 shows the procedure of the processing of the error correction device.

The behavior of the error correction device 100 of the present embodiment thus structured will be described with reference to FIGS. 12, 13, and 14.

Step (e-1): in order to perform error correction, the system control unit 1 outputs the DMA command 12 to the DMA control unit 2 so as to provide instructions to transfer data equivalent to one code word in the horizontal direction×13 times, or one sector from the buffer memory 4 to the syndrome calculator 5 and to the error detector 7.

Step (e-2): the DMA control unit 2 outputs the DMA request 13 to the bus control unit 3 so as to request the data transfer from the buffer memory 4 to the syndrome calculator 5 and to the error detector 7.

Step (e-3): the bus control unit 3 puts the data bus 11 in commission, and outputs the buffer memory access signal 14 to the buffer memory 4. The bus control unit 3 then outputs the syndrome data supply signal 15 and the error detector data supply signal 20 to the syndrome calculator 5 and the error detector 7, respectively, so as to supply the data read from the buffer memory 4 to the syndrome calculator 5 and to the error detector 7.

Step (e-4): the syndrome calculator 5 calculates a syndrome 16 of the transferred horizontal code word, and outputs the syndrome 16 to the error corrector 6. If the code word contains an error-containing code, or if the syndrome is not zero, the syndrome calculator 5 outputs the error-containing code detection signal 22 to the error corrector 7 and to the system control unit 1. The syndrome calculator 5 also provides the system control unit 1 with the error-containing code word signal 23 indicating the code word from which an error has been detected.

At the same time, the error detector 7 executes an error detecting process. Prior to the error detection, the mid-term results of the EDCs in the preceding code words stored in the corresponding one of the mid-term result registers 801–816 are reloaded. If the syndrome is zero when the transfer of each code word is over, the mid-term results of the EDCs are stored in the corresponding mid-term result register again. When the syndrome is not zero, on the other hand, the mid-term results of the EDCs in the preceding code words are maintained, without updating the contents of the corresponding mid-term result register.

In the first code word (the first line of the horizontal direction), the mid-term result register is initialized because it contains no mid-term results. When the first detection of an error-containing code in the sector in process is informed by the error-containing code detection signal 22, the contents of the corresponding mid-term result register are not updated, and the subsequent code words are not subjected to error detection.

Step (e-5): the error corrector 6 receives data read from the buffer memory 4 by means of the error corrector access signal 18 outputted by the bus control unit 3, corrects an error in the code, and transmits the access request signal 17 to the bus control unit 3 to request writing of the error-corrected data to the buffer memory 4 again.

Step (e-6): after putting the data bus 11 in commission, the bus control unit 3 reads the error-corrected data from the error corrector 6 and writes them to the buffer memory 4. When error correction for one sector is complete, the error corrector 6 outputs the correction completion signal 19 to the system control unit 1.

Step (e-7): the system control unit 1 outputs the DMA command 12 to the DMA control unit 2 in order to check to see that the error-corrected data contain no error in the sector in process, and provides instructions for data transfer from the buffer memory 4 to the error corrector 7. This data transfer involves data from the code word indicated by the error-containing code word signal 23 outputted together with the error-containing code detection signal 22 outputted first in the sector in process by the syndrome calculator 5 at step (b-4) up to and including the final code word in the sector. This is within the re-calculation range of an EDC shown in FIG. 13, which eliminates the need for transfer of data in the valid range of the mid-term results of an EDC in each sector.

Step (e-8): the DMA control unit 2 outputs the DMA request 13 to the bus control unit 3 so as to request the data transfer from the buffer memory 4 to the error detector 7.

Step (e-9): after putting the data bus 11 in commission, the bus control unit 3 outputs the buffer memory access signal 14 to the buffer memory 4 to read the data therefrom. Then, the bus control unit 3 outputs the error detector data supply signal 20 to the error detector 7 so as to supply the data read from the buffer memory 4.

Step (e-10): the error detector 7 executes error detection for the transferred subsequent data, by using the mid-term results of error detection stored in the corresponding mid-term result register. The error detector 7 then transmits the error detection signal 21 to the system control unit 1 so as to inform whether an error has been detected or not.

Thus, error correction and error detection for one sector is complete. The horizontal error correction for one ECC block is completed by repeating these steps for 16 sectors.

In Embodiments 1 and 3 having the single mid-term result register 8, the re-transfer of data in the case where an error has been detected is started from the error-containing code word detected first in one ECC block. In contrast, in the present embodiment having the 16 mid-term result registers corresponding to the 16 sectors, it becomes possible to start the re-transfer of data from the error-containing code word detected first in each sector. This further reduces the time required for error correction and the power consumption.

The present embodiment has 16 mid-term result registers to be provided to the 16 sectors in one ECC block. Instead, one ECC block can be divided into regions each composed of several sectors (four, for example), and the same number of (four) mid-term result registers can be provided. Thus, while reducing the number of mid-term result registers, the data transfer when an error has been detected can be started from the error-containing code word first detected in the divided regions. This reduces the time required for error correction and the power consumption in the same manner as in the present embodiment.

Embodiment 6

In the present embodiment, error correction is performed concurrently in three different ECC blocks by pipeline processing.

Figure 15:
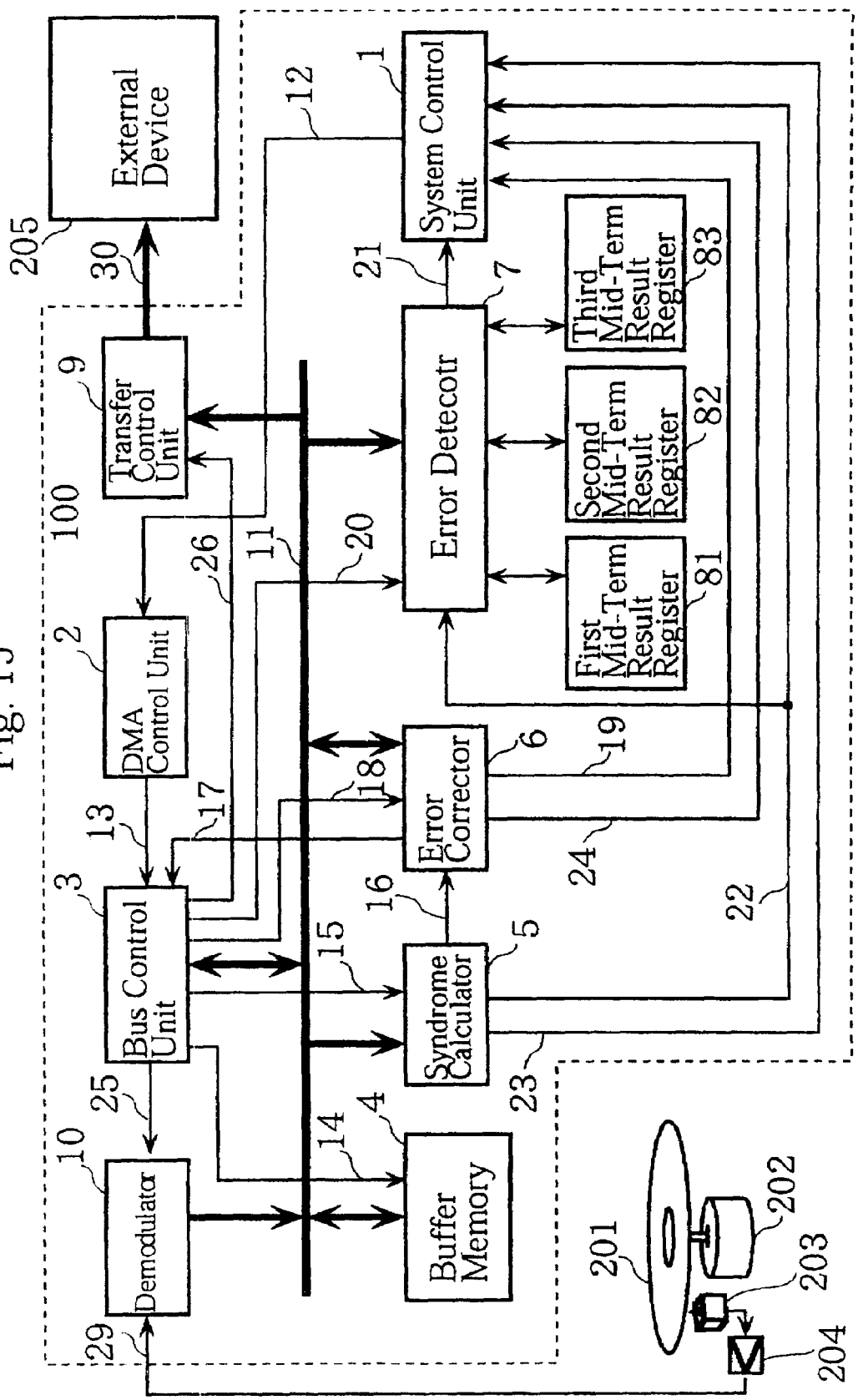
FIG. 15 shows the structure of the error correction device of Embodiment 6 of the present invention.

FIG. 15 shows the structure of the error correction device 100 of the present embodiment. According to the pipeline processing in error correction of the three ECC blocks, horizontal error correction in two ECC blocks and vertical error correction in the other ECC block are carried out at the same time. To realize the pipeline processing, in the error correction unit 100 of the present embodiment, the error corrector 7 has three mid-term result registers 81, 82, and 83, and the error corrector 6 outputs an error correcting position signal 24.

The behavior of the error correction device 100 of the present embodiment thus structured will be described as follows. While only one-time horizontal error correction is performed in Embodiments 1 through 5, the present embodiment performs error correction three times in the horizontal direction, the vertical direction, and the horizontal direction in this order.

Figure 16:
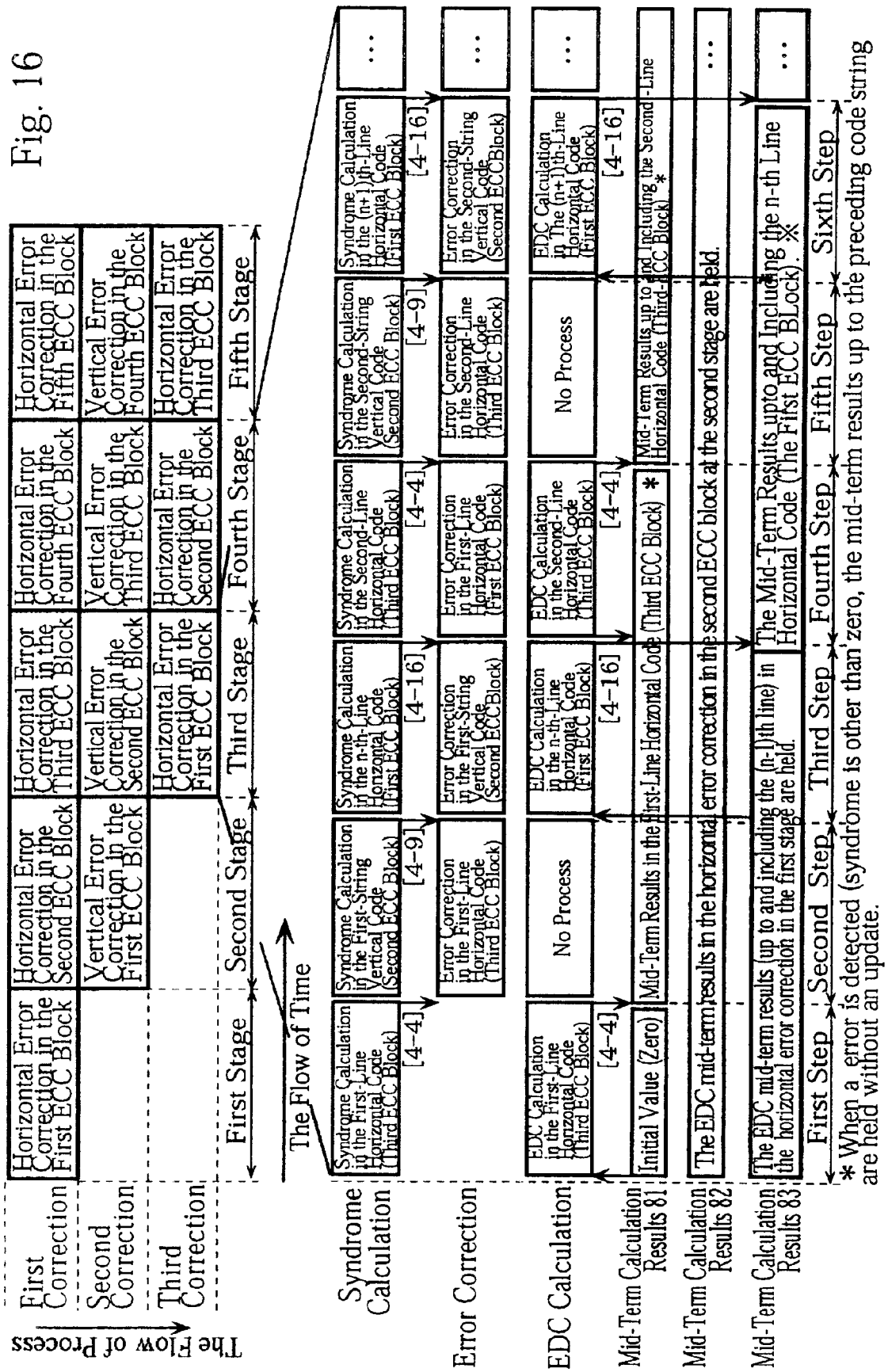
FIG. 16 is a timing chart illustrating the operation of the error correction device of the embodiment FIG. 17 explains the error-containing codes and the data transfer range of the error correction device of the embodiment.

The pipeline processing in the three-time error correction is shown in FIG. 16. At the first stage, horizontal error correction (the first-time error correction) is started only for the first ECC block. At the second stage, vertical error correction (the second-time error correction) is done for the first ECC block, and horizontal error correction (the first-time error correction) is started for the second ECC block. At the third stage, horizontal error correction (the third-time error correction) is done again for the first ECC block, the vertical error correction (the second-time error correction) is done for the second ECC block, and horizontal error correction (the first-time error correction) is started for the third ECC block.

In this manner, error correction for as many as three different ECC blocks is performed in parallel at the same stage, and at each stage the error correction is divided into plural steps. In the case of a DVD, the direction to read data for EDC calculation is the same as the syndrome calculation in the horizontal direction, and it is possible to perform EDC calculation in parallel with the syndrome calculation at the first-time and third-time error correction in the horizontal direction.

The flow of the process of the EDC calculation performed concurrently with the syndrome calculation at the third stage will be described with reference to FIGS. 15 and 16.

The first-time error correction for the third ECC block will be described as follows. The following steps (f-1) through (f-6) are basically the same as steps (d-1) through (d-6) in Embodiment 3, so that the procedure will not be illustrated.

Step (f-1): in order to execute the first-time error correction for the third ECC block, the system control unit 1 outputs the DMA command 12 to the DMA control unit 2 so as to provide instructions to transfer data corresponding to a horizontal code word in the third ECC block from the buffer memory 4 to the syndrome calculator 5 and to the error detector 7.

Step (f-2): the DMA control unit 2 outputs the DMA request 13 to the bus control unit 3 so as to request the data transfer from the buffer memory 4 to the syndrome calculator 5 and to the error detector 7.

Step (f-3): the bus control unit 3 puts the data bus 11 in commission, and outputs the buffer memory access signal 14 to the buffer memory 4 to read data therefrom The bus control unit 3 then outputs the syndrome data supply signal 15 and the error detector data supply signal 20 to the syndrome calculator 5 and the error detector 7, respectively, so as to supply the data read from the buffer memory 4 to the syndrome calculator 5 and to the error detector 7.

Step (f-4): the syndrome calculator 5 calculates a syndrome 16 of the transferred horizontal code word, and outputs the syndrome 16 to the error corrector 6. If the code word contains an error-containing code or if the syndrome is not zero, the syndrome calculator 5 outputs the error-containing code detection signal 22 to the error detector 7 and to the system control unit 1. The syndrome calculator 5 also provides the system control unit 1 with the error-containing code word signal 23 indicating the code word from which an error has been detected in order to determine the code word to start the syndrome calculation and the valid range of an EDC in the third-time error correction.

The error detector 7 executes error detection for the transferred data in parallel with the syndrome calculator 5. Prior to the error detection, the mid-term results of the EDCs in the preceding code words stored in the first mid-term result register 81 are reloaded. If the syndrome is zero when the transfer of the code words is over, the mid-term results of the EDCs are stored in the first mid-term result register 81 again. When the syndrome is not zero, on the other hand, the mid-term results of the EDCs in the previous code words whose syndromes have been zero are maintained, without updating the contents of the first mid-term result register 81. In the first code word (the first line of the horizontal direction), the first mid-term result register 81 is initialized because it contains no mid-term results.

When the detection of the error-containing code is informed by the error-containing code detection signal 22 as in the first embodiment, the contents of the first mid-term result register 81 are not updated, and the subsequent code words are not subjected to error detection.

Step (f-5): the error corrector 6 corrects an error in the code, and transmits the access request signal 17 to the bus control unit 3 to request writing of the error-corrected data to the buffer memory 4.

Step (f-6): after putting the data bus 11 in commission, the bus control unit 3 reads the error-corrected data from the error corrector 6 and writes them to the buffer memory 4.

The steps (f-1) through (f-6) are repeated 13 times to complete error correction for one sector, and the error corrector 16 outputs the error completion signal 19 to the system control unit 1.

The above procedure is repeated for 16 sectors to complete the horizontal error correction of one ECC block. When the syndrome is zero in all the code words and the results of the EDCs are zero in all the sectors, or when there is no error in one ECC block, error correction can be completed only by the first-time error correction.

Figure 17:
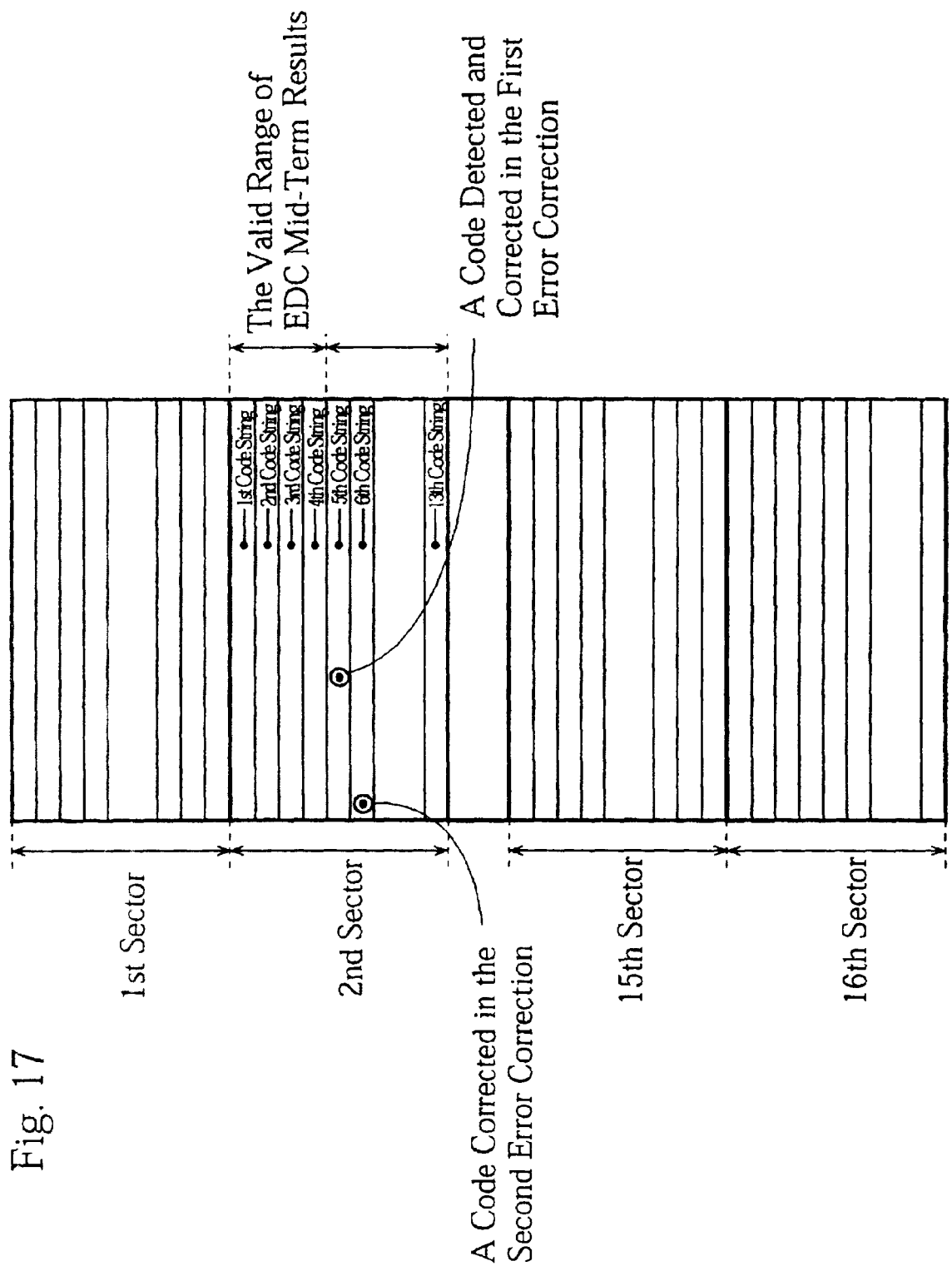

However, in reality, an error-containing code may exist in some cases. Assume that there is an error-containing code on the fifth line (the fifth code word in the horizontal direction) in the second sector as shown in FIG. 17. In this case, the mid-term results found in the fifth code word are abandoned, and the contents in the first mid-term result register 81 are not updated. As a result, the mid-term results of the EDCs up to and including the fourth code word are held in the first mid-term result register 81 until the third-time error correction.

The system control unit 1 enters "18"(13+5) indicating the fifth code word in the second sector as the error-containing code word signal 23 and stores it. The error detecting process is suspended on and after the sixth code word in the second sector, and syndrome calculation is exclusively executed.

The second-time error correction of the second ECC block will be described as follows.

When an error is detected, or when the results of the EDC are other than zero in spite of no error having been detected, the second ECC block is subjected to vertical error correction (the second-time error correction) executed following the horizontal error correction.

Step (f-7): in order to perform the second-time error correction for the second ECC block, the system control unit 1 outputs the DMA command 12 to the DMA control unit 2, so as to provide instructions to transfer data corresponding to one code word in the vertical direction within the second ECC block from the buffer memory 4 only to the syndrome calculator 5. In vertical syndrome calculation, error detection is not executed, but the mid-term results of the first-error correction which are obtained at the second stage and stored in the second mid-term result register 82 are maintained.

Step (f-8): the DMA control unit 2 outputs the DMA request 13 to the bus control unit 3 so as to request the data transfer from the buffer memory 4 to the syndrome calculator 5.

Step (f-9): after putting the data bus 11 in commission, the bus control unit 3 outputs the buffer memory access signal 14 to the buffer memory 4 to read the data therefrom. Then, the bus control unit 3 outputs the syndrome data supply signal 15 to the syndrome calculator 5 so as to supply the data read from the buffer memory 4.

Step (f-10): the syndrome calculator 5 calculates the syndrome of each vertical code word in the transferred second ECC block, and outputs the syndrome 16 to the error corrector 6. The syndrome calculator 5 then outputs the error-containing code detection signal 22 to the system control unit 1 when the code word has an error, or when the syndrome 16 is not zero.

Step (f-11): the error corrector 6, after correcting an error in the code, transmits the access request signal 17 to the bus control unit 3 to request writing of the error-corrected data to the buffer memory 4. The error corrector 6 further provides the system control unit 1 with the error correcting position signal 24 indicating the position of the error-corrected data. By using the error correcting position signal 24 and the error-containing code word signal 23 obtained in the first-time error correction, it is determined whether the error correction and the error detection for one ECC block in the third-time error correction should be performed from the beginning or from a halfway point.

Step (f-12): after putting the data bus 11 in commission, the bus control unit 3 reads the error-corrected data from the error corrector 6 and writes the data to the buffer memory 4.

Figure 1:
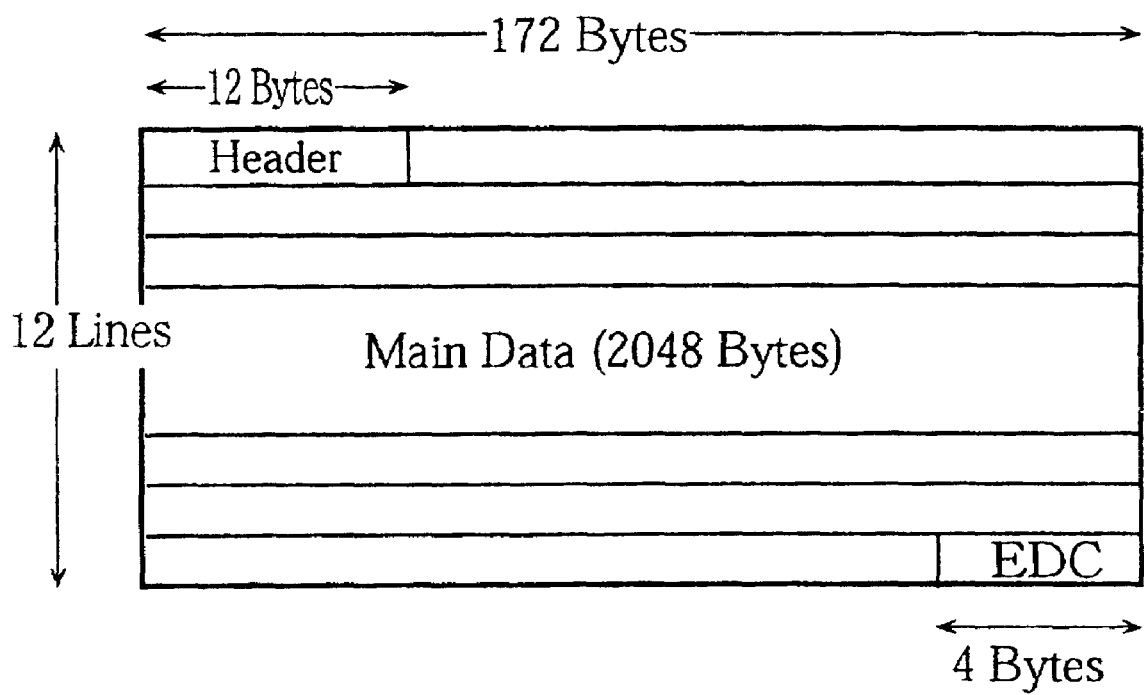
FIG. 1 shows the data format for one sector of a DVD.
Figure 2:
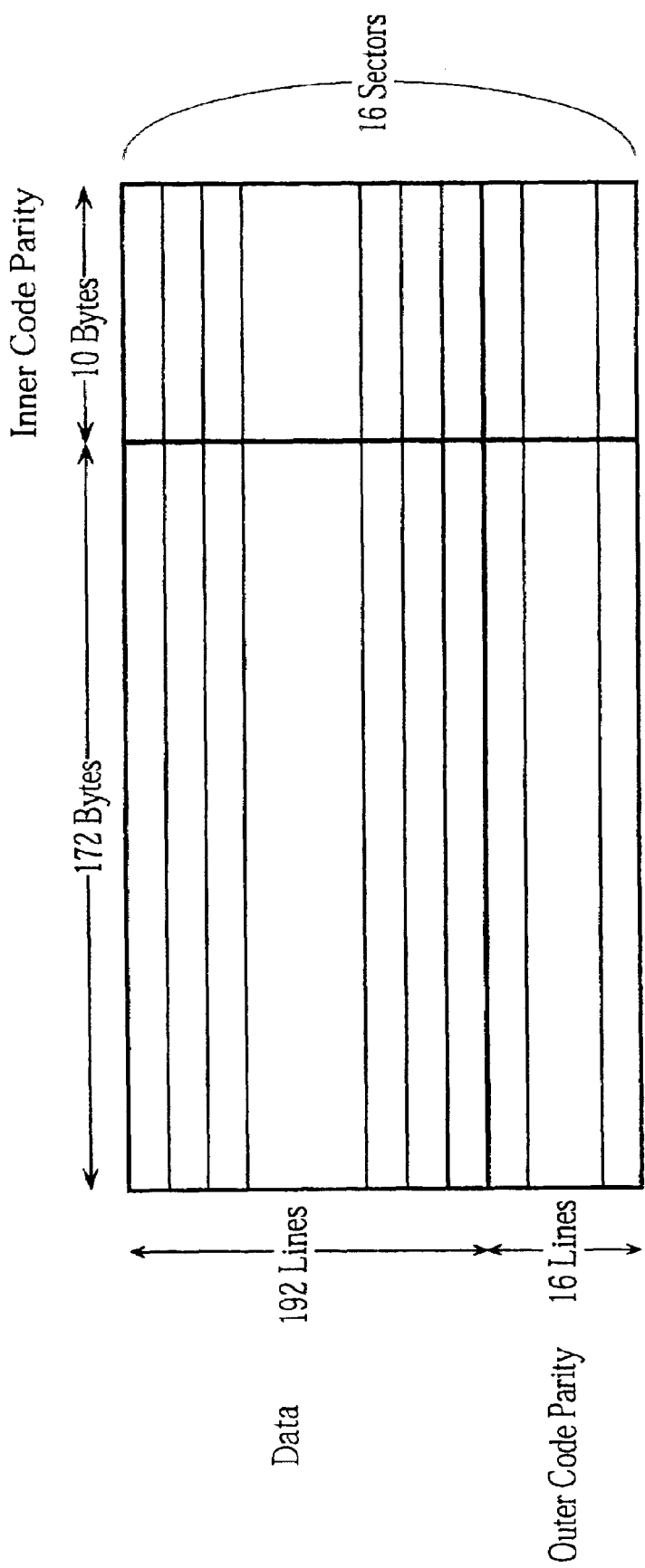
FIG. 2 shows the data format for one block including ECCs of a DVD.
Figure 3:
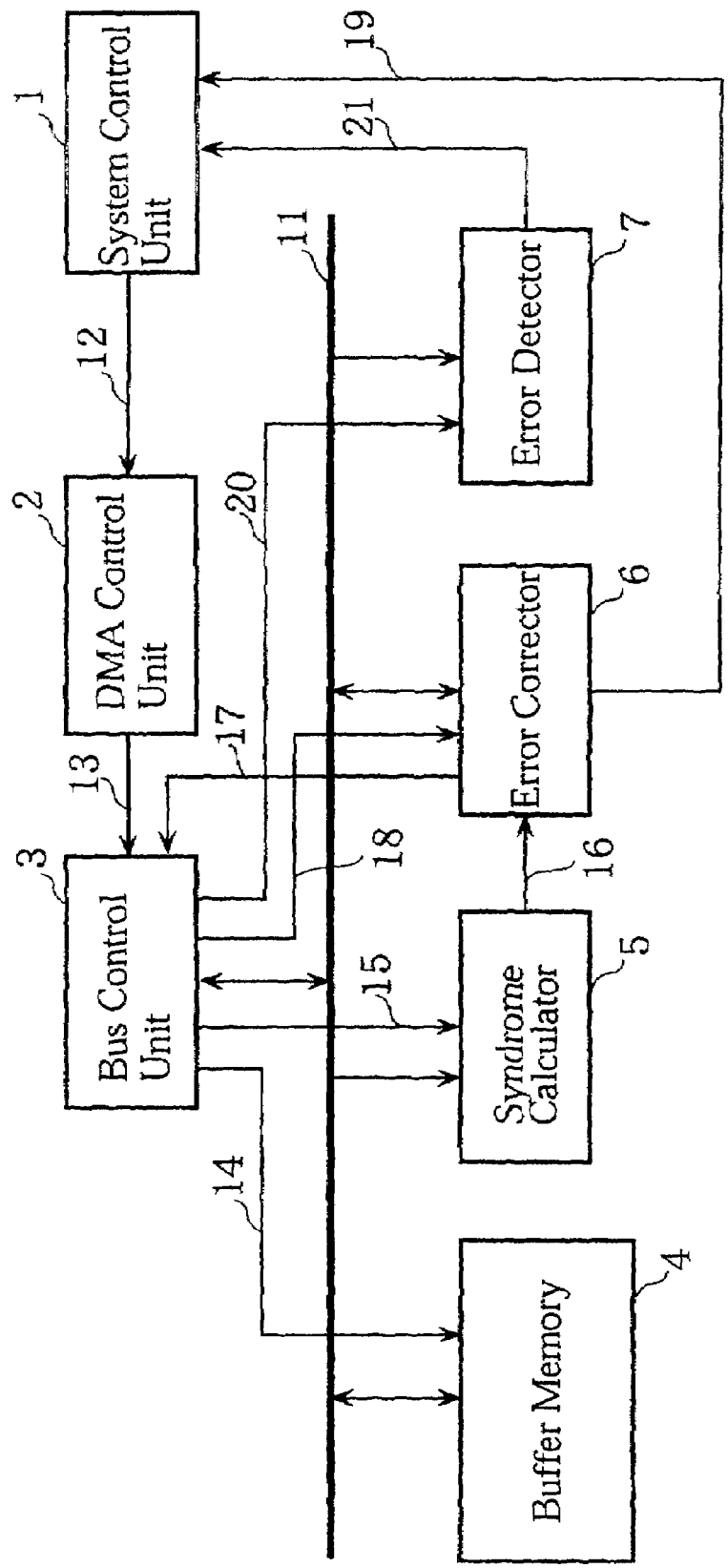
FIG. 3 shows the structure of a prior art error correction device.
Figure 4:
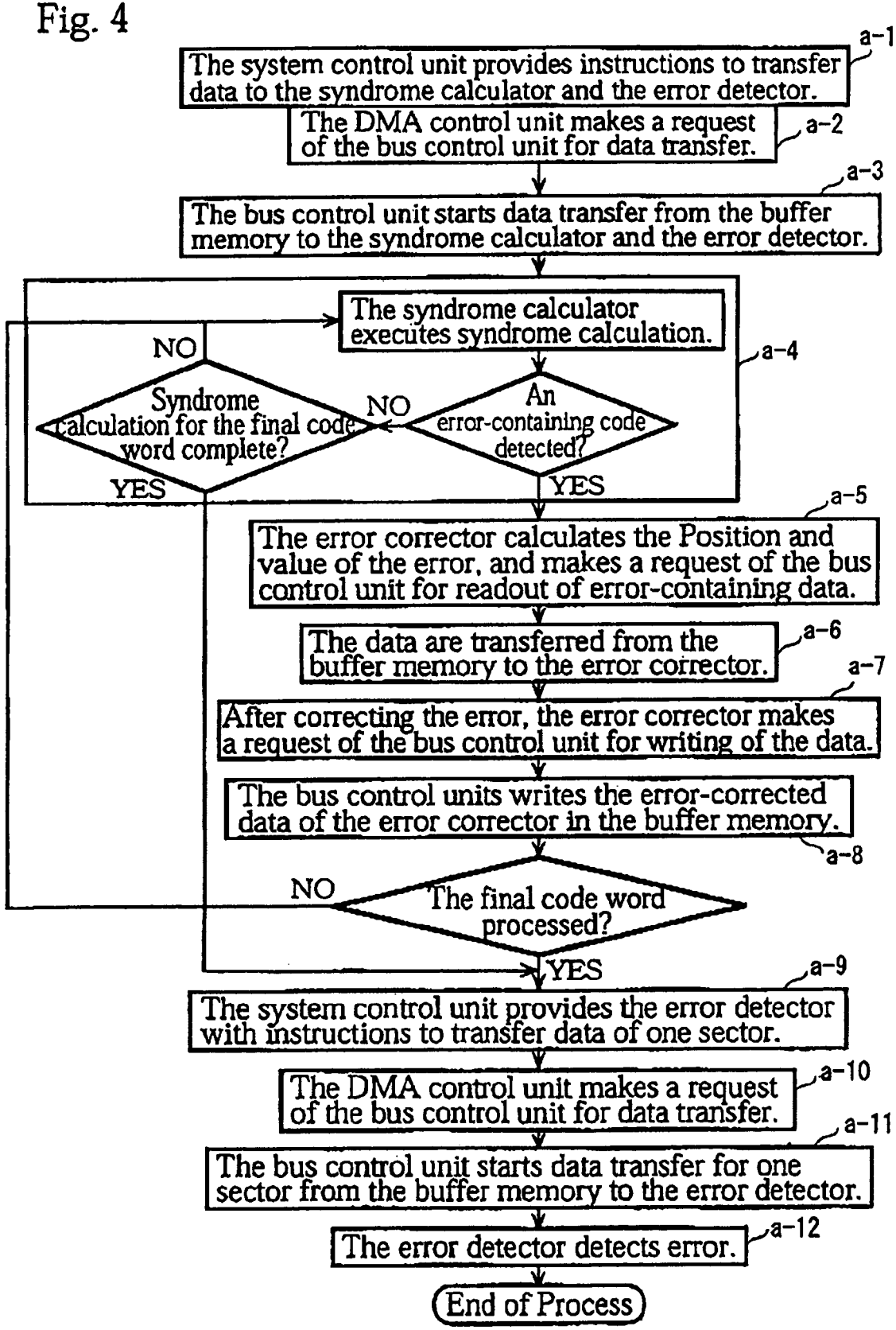
FIG. 4 shows the procedure (flow chart) of the processing of the prior art error correction device.

The vertical error correction for one ECC block is completed by repeating steps (f-7) through (f-12) as many as the vertical strings shown in FIG. 2, that is 182 times.

For example, if there is an error-containing code in the sixth line of the second sector in the vertical first code word, the system control unit 1 receives, as the error correcting position signal 24, "19" indicating the position of the code word from the head position in the vertical direction and stores this.

Thus, the horizontal error correction and the vertical error correction are executed in a similar manner except for the following:

(1) the direction of reading data;
(2) whether or not EDCs are calculated in parallel with syndromes; and
(3) which of the error-containing code word signal and the error correcting position signal is outputted Finally, the third-time error correction for the first ECC block will be described as follows.

Using the error-containing code word signal 23 found in the first-time error correction and the error correcting position signal 24 found in the second-time error correction, the system control unit 1 determines whether the error-containing code has been detected and the error has been corrected within the valid range of the mid-term results of the EDCs at the second-time error correction, that is, whether the mid-term results of the EDCs are valid or not.

The mid-term results of the EDCs obtained in the first-time error correction are valid unless the error correction is done within the valid range of the mid-term results of the EDCs. In this case, data transfer is started from the code word on the n-th line indicated by the error-containing code word signal 23 found in the first-time error correction so as to perform syndrome calculation, and in parallel with the syndrome calculation, error detection is performed using the mid-term results of the EDC held in the third mid-term result register 83. On the other hand, when an error in data is corrected within the valid range of the mid-term results of an EDC, the mid-term results of the EDC are invalid, and data transfer is started from the head code word in the sector from which the error-containing code has been detected.

Step (f-13): in order to execute the third-time error correction for the third EGG block, the system control unit 1 outputs the DMA command 12 to the DMA control unit 2 so as to provide instructions to transfer data corresponding to a horizontal code word in the third EGG block from the buffer memory 4 to the syndrome calculator 5 and to the error detector 7.

Step (f-14): the DMA control unit 2 outputs the DMA request 13 to the bus control unit 3 so as to request the data transfer from the buffer memory 4 to the syndrome calculator 5 and to the error detector 7.

Step (f-15): the bus control unit 3 puts the data bus 11 in commission, and outputs the buffer memory access signal 14 to the buffer memory 4 to read data therefrom. The bus control unit 3 then outputs the syndrome data supply signal 15 and the error detector data supply signal 20 to the syndrome calculator 5 and the error detector 7, respectively, so as to supply the data read from the buffer memory 4 to the syndrome calculator 5 and to the error detector 7.

Step (f-16): the syndrome calculator 5 calculates a syndrome 16 of the transferred horizontal code word, and outputs the syndrome 16 to the error corrector 6. If the code word contains an error-containing code or if the syndrome is not zero, the syndrome calculator 5 outputs the error-containing code detection signal 22 to the error detector 7 and to the system control unit 1. The syndrome calculator 5 also provides the system control unit 1 with the error-containing code word signal 23 indicating the code word from which an error has been detected.

The error detector 7 executes an error detecting process for the transferred data in parallel with the syndrome calculator 5. Prior to the error detection, the mid-term results of the EDCs in the preceding code words stored in the third mid-term result registers 83 are reloaded. If the syndrome is zero when the transfer of the code words is over, the midterm results of the EDCs are stored in the third mid-term result register 83 again. When the syndrome is not zero, on the other hand, the mid-term results of the EDCs in the preceding code words are maintained, without updating the contents of the third mid-term result register 83. In the first horizontal code word, the third mid-term result register 83 holds the mid-term results obtained in the first-time error correction. If the detection of an error is informed by the error-containing code detection signal 22, the subsequent code words are not subjected to error detection.

Step (f-17) the error corrector 6 corrects an error in the code, and transmits the access request signal 17 to the bus control unit 3 to request writing of the error-corrected data to the buffer memory 4.

Step (f-18): after putting the data bus 11 in commission, the bus control unit 3 reads the error-corrected data from the error corrector 6 and writes them to the buffer memory 4.

Step (f-19): the system control unit 1 outputs the DMA command 12 to the DMA control unit 2 in order to check to see that the error-corrected data contain no error, and provides instructions for data transfer from the buffer memory 4 to the error detector 7. This data transfer involves data from the code word indicated by the error-containing code word signal 23 outputted together with the error-containing code detection signal 22 outputted first by the syndrome calculator 5 at step (f-4).

Step (f-20): the DMA control unit 2 outputs the DMA request 13 to the bus control unit 3 so as to request the data transfer from the buffer memory 4 to the error detector 7.

Step (f-21): after putting the data bus 11 in commission, the bus control unit 3 outputs the buffer memory access signal 14 to the buffer memory 4 to read the data therefrom. Then, the bus control unit 3 outputs the error detector data supply signal 20 to the error detector 7 so as to supply the data read from the buffer memory 4.

Step (f-22): using the mid-term results of the error detection stored in the third mid-term register 83, the error detector 7 executes error detection of the transferred subsequent data, and transmits the error detection signal 21 to the system control unit 1 so as to inform whether an error has been detected or not.

The error correction for one sector is completed by repeating steps (f-13) through (f-22) 13 times, and the horizontal error correction for one ECC block is completed by repeating this procedure for 16 sectors. In the third-time error correction, if the mid-term results of error detection obtained in the first-time error correction and stored in the third mid-term register 83 are valid, the number of repetition can be lessened in accordance with the position of the code word from which the error-containing code has been detected in the first-time error correction. This is the advantage of the present embodiment.

For example, in the second-time error correction shown in FIG. 17, when error-containing codes are all contained in or after the sixth line of the second sector, the mid-term results of the EDCs held in the mid-term result register 81 are valid. With the use of the mid-term results, data transfer is started from the sixth code word in the second sector so as to perform syndrome calculation and error detection.

However, when an error-containing code is contained before the fifth line of the second sector, namely, in the second line of the second sector, the mid-term results of the EDCs become invalid. In this case, data transfer is started from the head of the second sector that is the sector following the sector (the first sector in this case) in which there is no error to be corrected in the second-time error correction.

Since the EDC calculation is performed one sector at a time, the start of data transfer is restricted to the head of a sector, using the error-containing code word signal and the error correcting position signal as data indicating the sector having an error-containing code. This can reduce the number of registers to hold the first-time mid-term results although more amount of data must be transferred for correction again than in the case where the start of the data transfer is indicated in code word units.

Finally, steps (f-19) through (f-22) are executed once so as to terminate the error detection of one ECC block. In this case, the data transfer from the buffer memory 14 to the error detector 7 is started from the code word indicated by the error-containing code word signal 23 first outputted from the syndrome calculator 5 in the third-time error correction. This effect shown in Embodiments 1 through 3 is also provided by the present embodiment.

As described hereinbefore, in the present embodiment, three-time error correction with the single error corrector 6 is performed by transferring data to the error detector 7 at the same time as the data transfer from the buffer memory 4 to the syndrome calculator 5. Until an error-containing code is detected by the syndrome calculator 5, error detection is executed in parallel with the syndrome calculation. In the error detection after the error corrector 6 has corrected an error, the mid-term results of error detection obtained before the detection of the error-containing code are used. This eliminates the need for all data in one ECC block being transferred from the buffer memory 4 to the error detector 7, thereby enabling an error detecting process to be started from a halfway point. This greatly reduces the time required for error correction and the power consumption in the same manner as in the present embodiment.

Although the present embodiment describes three-time error correction, it can be more than three times. It goes without saying that with probable technological development in the future, five-time error correction for a DVD could be realized by providing five mid-term result registers, and that the process of EDCs could be greatly reduced in accordance with the degree of errors.

When there are only few errors in the second-time error correction, the third-time error correction can be canceled and only error detection can be executed.

In the pipeline processing shown in FIG. 16 of the present embodiment, in order to improve throughput, data are stored in the buffer memory 4 in descending order of ECC blocks, and after the error correction, data are transferred downstream in descending order in unit time of the pipeline processing. Instead, some ECC blocks could be stored collectively in the buffer memory 4 (so-called batch processing) and after the error correction, some ECC blocks could be transferred downstream collectively in the descending order. This system is convenient for the case where access to the data-storing medium is often busy.

The system is also convenient when discrete scenes are reproduced at high speed in accordance with the predetermined procedure in order to retrieve specific images in a movie. In this case, it is necessary to provide a means compliant with the standard so as to recognize each scene and discrete scenes.

The system will be also convenient in the case where error correction is needed across several ECC blocks because a disk has a blemish or a stain while being handled by users, although probable technological development in the future will lessen error correction. Thus, most ECC blocks with few error correction would be flown downstream as they are, and ECC blocks requiring minor error correction are collectively subjected to error correction, and when error correction is difficult, another process would be applied to collective ECC blocks.

Embodiment 7

Figure 18:
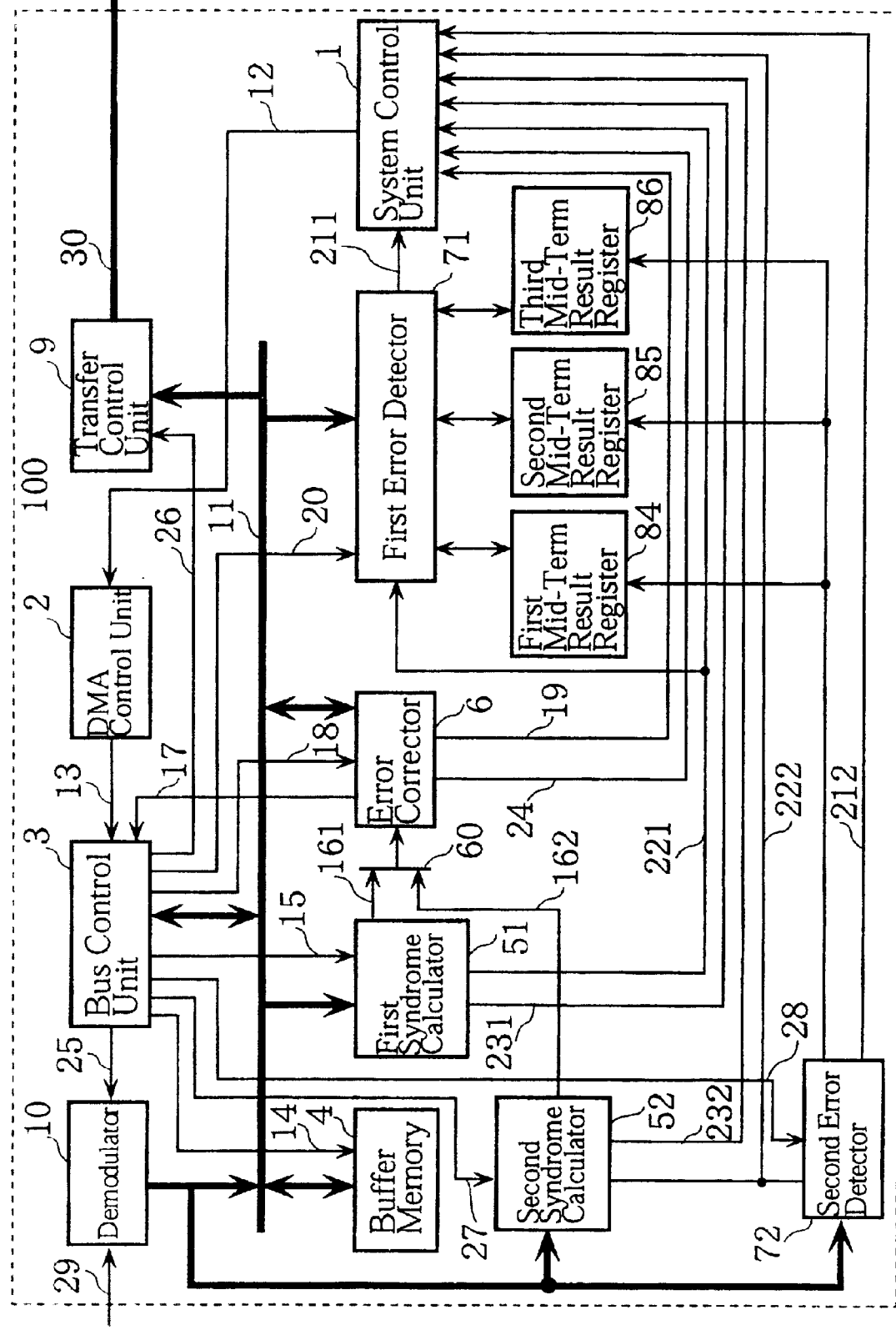
FIG. 18 shows the structure of the error correction device of Embodiment 7 of the present invention.

While in Embodiment 6, error correction and error detection are performed in the first-time error correction for a code word temporarily stored in the buffer memory 4, in the present embodiment the first-time error correction and detection are performed in parallel with demodulation. In order to realize this feature, as shown in FIG. 18, the error detection device of the present embodiment comprises two syndrome calculators and two error detectors. The error detection device will be described as follows with reference to FIG. 18.

The drawing includes the first and second syndrome calculators 51 and 52, and the first and second error detectors 71 and 72. The upstream and downstream units are not illustrated.

The error detection device 100 receives data stored in an optical disk as a reception code 29 from the amplifier. The reception code 29 is entered to the demodulator 10. The demodulated code is stored in the buffer memory 4 by means of the demodulating code input signal 25 outputted from the bus control unit 3, and also supplied to the second syndrome calculator 52 and to the second error detector 72.

In order to perform error correction and error detection with the code word read from the buffer memory 4, the first syndrome calculator 51 and the first error detector 71 are arranged separately. The input of the error corrector 6 is connected to a selection circuit 60 so that the error corrector 6 can select between the syndromes transmitted from the first and second syndrome calculators 51 and 52.

The second syndrome calculator 52 calculates a syndrome 162 of each transferred horizontal code word, and outputs the syndrome 162 to the error corrector 6. If the code word contains an error-containing code or if the syndrome 162 is not zero, the second syndrome calculator 52 outputs the error-containing code detection signal 222 to the second error corrector 72 and to the system control unit 1. The second syndrome calculator 52 also provides the system control unit 1 with an error containing code word signal 232 indicating the code word from which an error has been detected.

The second error detector 72 executes an error detecting calculation for the transferred data in parallel with this.

When the second syndrome calculator 52 detects an error-containing code word, the error corrector 6 performs error correction, and the results are written in the buffer memory 4. Then, vertical error detection and correction and the second-time and later horizontal error detection and correction are executed by the first syndrome calculator 51 and the first error detector 71. Prior to the error detection, the mid-term results of the EDCs in the preceding code words stored in the mid-term result register assigned in the pipeline processing are reloaded. If the syndrome is zero when the transfer of the code words is over, the mid-term results of the EDCs are stored in the mid-term result register again. When the syndrome is not zero, on the other hand, the mid-term results of the EDCs in the preceding code words are maintained, without updating the contents of the mid-term result register.

Figure 19:
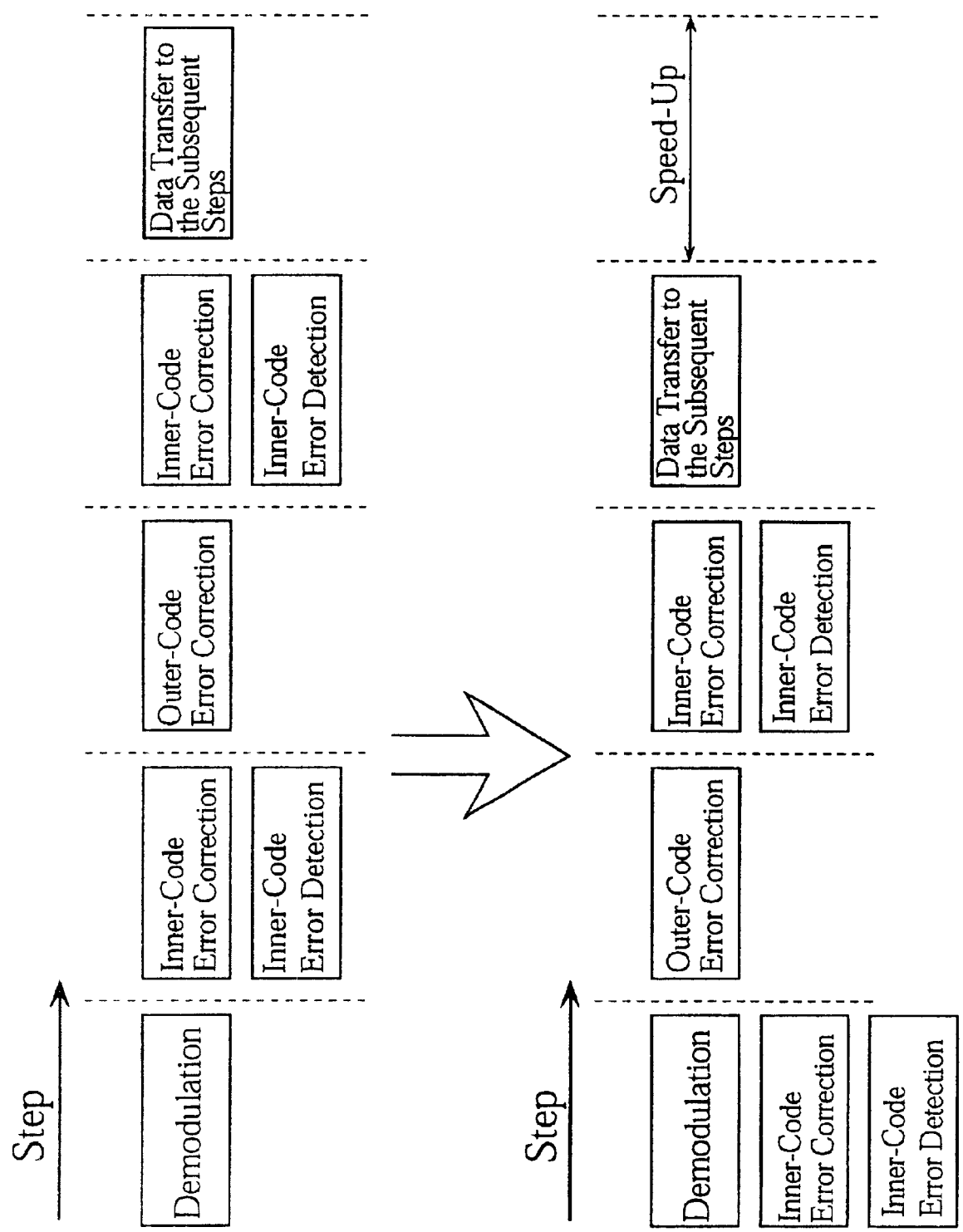
FIG. 19 conceptually shows the effects of the pipeline processing in the error correction device of the embodiment.

FIG. 19 conceptually shows changes in the contents (structure, flow) of the pipeline processing due to the provision of the second syndrome calculator 52, or how the process is speeded up. This drawing indicates that the process is speeded up by one step.

Embodiment 8

The present embodiment is an improvement of Embodiment 7.

In Embodiment 7 the second syndrome calculator 52 and the second error detector 72 process demodulated data only. In this case, while the second syndrome calculator 52 is performing syndrome calculation for demodulated data (a code word) one time, the first syndrome calculator 51 executes syndrome calculation for data in the buffer memory 4 twice. Thus, if these syndrome calculators have an equal capacity, the second syndrome calculator 52 will stand idle for some time.

CPU-related data require highly precise error correction, and data stored in media that have been under poor storage conditions for a long time period may demand repeated error correction. It is highly likely in such a case that if the first syndrome calculator 51 exclusively processes data in the buffer memory 4, the second syndrome calculator 52 sits idle. Hence, in the present embodiment, after the demodulated data are stored in the buffer memory 4, the second syndrome calculator 52 is also designed to perform error correction.

Figure 20:
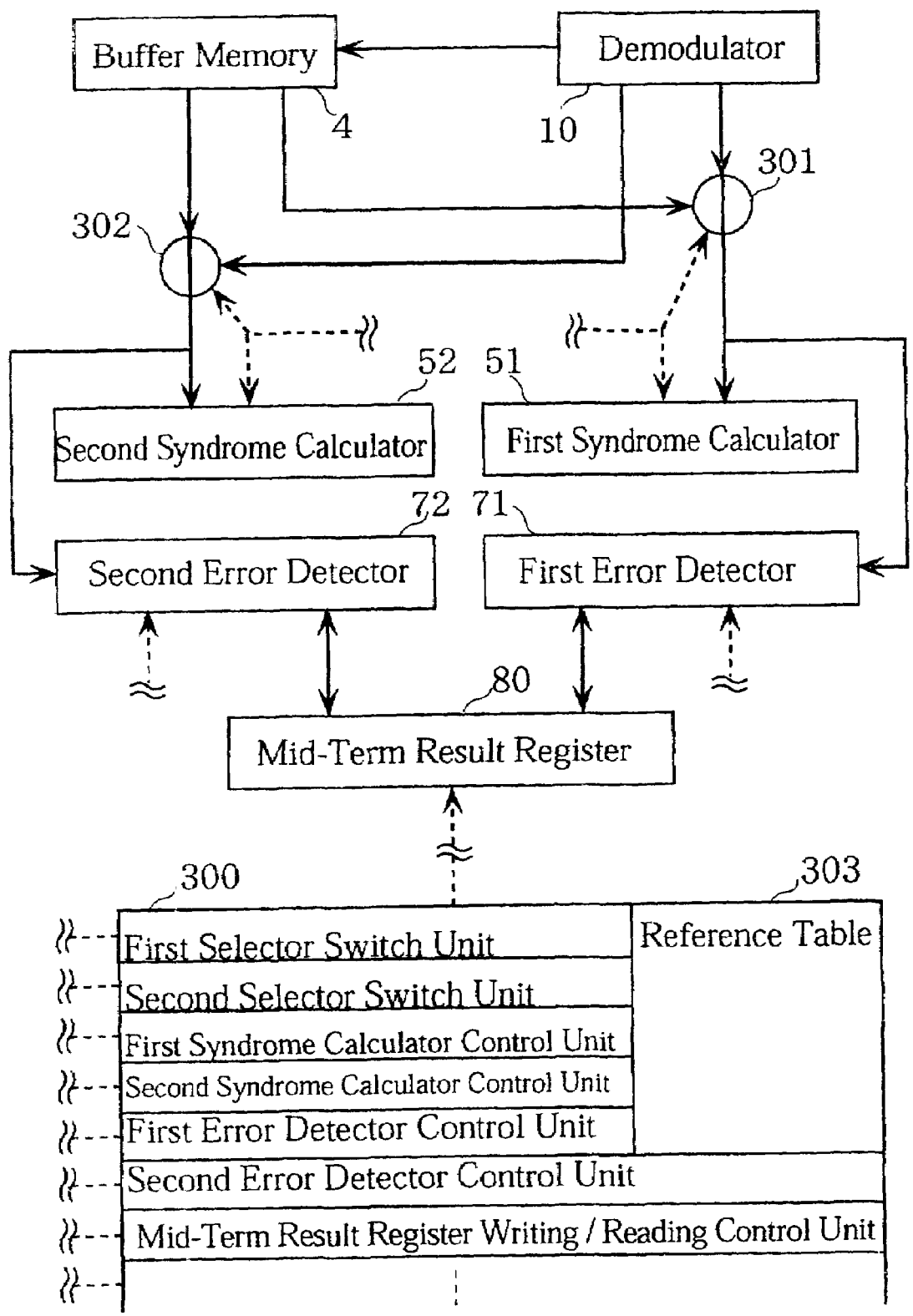
FIG. 20 shows the structure of the error correction device of Embodiment 8 of the present invention.

FIG. 20 shows the structure of the main part of the error correction device of the present embodiment.

The error correction device of the present embodiment basically has the same structure as the device of Embodiment 7 shown in FIG. 18 except that the first and second syndrome calculators 51, 52 and the first and second error detectors 71, 72 are connected also to the buffer memory 4 and that selectors 301, 302 select between data immediately after demodulation and data in the buffer memory 4 as a target of process.

The control unit 300 controls the ECC block, the sector, the sector group in process, the number of strings, and the number of times of correction for each component unit (means) of the device by forming reference lists. Based on the reference lists, the control unit 300 further controls the storage of the mid-term results of error correction to an appropriate address in the mid-term result register 80, and switching operations. FIGS. 21A and 21B conceptually show the contents of the reference table 303. FIG. 21A is a reference list containing ECC blocks and selectors which are being processed in each component unit. FIG. 21B is a reference list containing the position of data which are being processed in each ECC block and the number of times of error correction.

The control unit 300 refers to these lists synchronously with clock signals, and updates the contents of these lists to make each component unit perform a necessary process. With the present invention, it is not so difficult to compose, refer, and update these lists in terms of hardware or software, so that the description of the specific contents will be omitted.

As described hereinbefore, according to the present embodiment, data before the syndrome calculators 51, 52 detect an error-containing code can be subjected to an error detecting process in parallel with syndrome calculation, which eliminates the need for all data to be transferred from the buffer memory 4 to the first and second error correctors 71, 72 after error correction. This can reduce the time required for a sequence of error correcting process.

Pipeline processing for a plurality of ECC blocks can reduce the time required for a sequence of error correcting process.

Performing syndrome calculation and error detection with the writing of demodulated data to the buffer memory 4 can reduce the time required for a sequence of error correcting process.

Some types of data allow the writing of subsequent data to the buffer memory 4 and the transfer of error-corrected data downstream to be performed at the same time, which reduces the time required for a sequence of error correcting process.

The error correction is done in accordance with the contents and conditions of data, which reduces the time required for a sequence of error correcting process.

A combination of these processes can further reduce the time required for a sequence of error correcting process.

The present invention, which has been described based on the embodiments, is not restricted to them, and can be structured as follows.

1) Error-containing data on the buffer memory are temporarily read into the error corrector, and the error-corrected data are written back into the buffer memory. Instead of this, the address of the data on the buffer memory can be exclusively transmitted from the error corrector to the bus control unit, and the error in the data read based on the address from the buffer memory can be corrected in the bus control unit and written back to the buffer memory.

2) In the inventions of aspects 2, 4, and 6, instead of the system control unit controlling transfer data, the syndrome calculator can be provided with a detecting means for detecting from which code word an error-containing code has been detected, so the detection means can inform the system control unit of the code word detected. As a result, data can be transferred to the syndrome calculator by making the DMA control unit and the syndrome calculator do the handshake every code word. Then, the syndrome calculator informs only the presence or absence of a detected error to the DMA control unit. Therefore, data transfer is controlled within the DMA control unit.

The DMA transfer may be adopted in the inventions of the other aspects.

3) The number of bits in main data and in parity of a DVD can be different, depending on various standards. In some cases, the vertical direction and the horizontal direction can be opposite, or the order of error detection can be opposite (provided that it is substantially the same as the present invention).

4) In the invention of aspect 11 and the like, the number of sector groups can be varied between the portion where an error is highly likely to arise, and the other portion, due to the difference in position on a DVD such as an end portion and the center, and the fabrication method.

5) The error detector may not perform error detection although data are transferred to the error detector after the syndrome detection done by the syndrome calculator so as to exert substantially the same actions and effects as the present invention.

6) In the pipeline processing, the number of repetition of error correction for ECC blocks to be processed can be changed depending on the type of data and experience.

7) The number of times of error correction can be changed depending on the use pattern of data by the users. To be more specific, the number can be reduced when images are reproduced at high speed for retrieval. In this case, switching operations of the users are detected on the machine side, and processes are performed accordingly. To realize this necessary circuits and programs are provided at the fabricating stage.

8) In the eighth embodiment, the first and second syndrome calculators perform syndrome calculation for demodulated code words. Instead, one of the syndrome calculators can do it.

9) In the seventh embodiment, the syndrome calculator for demodulated code words can be slower in process and less expensive than the other syndrome calculator.

10) The error correction can be applied to broadcast such as a FM multiplex broadcast.

What is claimed is:

1. An error correction device comprising: a buffer memory for storing at least one sector of data comprising N words of error correcting code, each of such N words comprising a data unit, an inner code parity unit, and one error detecting code; a syndrome calculating means for generating syndrome for data read from said buffer memory; an error correcting means for correcting error-containing data in said buffer memory by detecting an error position from the syndrome generated by said syndrome calculating means and by calculating an error value; an error detecting means for detecting an error, individually for each sector, in error-corrected data generated by said error correcting means; a storing means for storing mid-term results of an error detecting process in said error detecting means, in code word units; a bus control means for controlling data transfer between said buffer memory, said syndrome calculating means, said error correcting means, and said error detecting means; and a system control means for performing processes for error correction in predetermined procedures at least one time, wherein said bus control means comprises:
a before-syndrome data transfer sub means for transferring data to be corrected from said buffer memory to said syndrome calculating means and to said error detecting means concurrently in code word units until said syndrome calculating means detects an error-containing code;
an after-syndrome data transfer sub means for, when said syndrome calculating means detects an error-containing code, transferring subsequent data in said buffer memory only to said syndrome calculating means in code word units; and
an error-detecting data transfer sub means for transferring error-corrected data from said buffer memory to said error detecting means in code word units for error detection, after said error correcting means corrects an error contained in data in said buffer memory based on the syndrome transmitted by said syndrome calculating means, said transferred error-corrected data including a code word from which the error-containing data has been detected up to and a final code word;

said error detecting means comprises:
a parallel process sub means for, until said syndrome calculating means detects an error-containing code, storing the mid-term results of the error detecting process to said storing means in code word units, and executing error detection of a code word transmitted from said buffer memory in parallel with syndrome calculation done by said syndrome calculating means; and
an after-correction error detecting sub means for executing error detection after said syndrome calculating means detects an error-containing data, for data transferred from said buffer memory after an error correction done by said error correcting means, following a code word at which an error code is detected using mid-term results already stored in said storing means, of code words before detection of an error code.

2. The error detection device of claim 1 further comprising a DMA control means for controlling DMA transfer to said buffer memory, wherein said system control means comprises:
a first DMA transfer sub means for providing said DMA control means with a first DMA transfer instruction indicating that data to be corrected should be transferred from said buffer memory to said syndrome calculating means and to said error detecting means at the start of an error correcting process; and
a second DMA transfer sub means for, after having been informed of completion of error correction by said error correcting means, only when said syndrome calculating means has detected an error-containing code, providing said DMA control means with a second DMA transfer instruction indicating that subsequent data including a code word from which said error-containing code has been detected based on error-containing code word information transmitted by said syndrome calculating means should be transferred from said buffer memory to said error detecting means; and said DMA control means comprises:

a transfer control sub means for making a request of said bus control means to perform DMA transfer in accordance with the first DMA transfer instruction and the second DMA transfer instruction transmitted by said system control means.

3. The error correction device of claim 1, wherein error correction is performed in parallel for data in a plurality of ECC blocks each having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction (data in the horizontal direction are referred to as sector) as a unit are subjected to the error correction, wherein said buffer memory is a plural-ECC-block-division buffer memory corresponding to a plurality of ECC blocks to be processed in parallel;

said storing means for storing mid-term results of an error detecting process generated by said error detecting means is an ECC-block-division storing means for storing said plurality of ECC blocks on a block-by-block basis;

said system control means comprises:

a means-basis ECC block pipeline processing notification sub means for transmitting ECC blocks which have been subjected to error correction downstream; for storing ECC blocks to be processed next to said plural-ECC-block-division buffer memory; and for making the storage known to said bus control means, said syndrome calculating means, said error detecting means, and said error correcting means;

a means-basis ECC block recognition sub means for recognizing a data transfer from said bus control means to said syndrome calculating means, to said error detecting means, and to said error correcting means for error detection and error correction; for recognizing the error correction done by said error correcting means; for recognizing writing of error-corrected data to said plural-ECC-block-division buffer memory done by said bus control means; for recognizing an ECC block in process when said error detecting means stores midterm results to said plural-ECC-block-division storing means, and for selecting ECC blocks to be processed; and an ECC block notification sub means in sub means-basis pipeline processing for notifying said first error detecting sub means, said even-numbered error correction sub means, said odd-numbered error correction sub means, said number-of-times control sub means, and said DMA transfer instruction sub means contained in said system control means that the error-corrected ECC blocks have been transmitted downstream and new ECC blocks to be processed have been stored in said plural-ECC-block-division buffer memory, and further notifying these same sub means contained in said system control means of the ECC blocks which are in process therein.

4. The error correction device of claim 3 further comprising:

two buffer memories each having a predetermined capacity equivalent to one sector or one ECC block;

a buffer memory storage means for alternately storing in said two buffer memories, in accordance with error correction speed, continuous data of the predetermined capacity which are a target of error correction and have been read from a DVD or a CD-ROM; and an accessed buffer memory switch means for switching between said two buffer memories in order to read or write data as a target of error correction alternately in units of said predetermined capacity.

5. The error correction device of claim 1, wherein error correction is performed in parallel for data in a plurality of ECC blocks each having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction (data in the horizontal direction are referred to as sector) as a unit are subjected to the error correction;

said buffer memory is an ECC-block-basis buffer memory for storing, on a block-by-block basis, ECC blocks to be processed in parallel;

said storing means for storing mid-term results of an error detecting process generated by said error detecting means is an ECC-block-and-code word-division storing means for storing ECC blocks in process on a block-by-block basis, and code words in each ECC block, in each sector, or in each sector group, on a string-by-string basis;

said system control means comprises:

an means-basis ECC block pipeline processing notification sub means for transmitting ECC blocks which have been subjected to error correction downstream; for storing ECC blocks to be processed next to said ECC-block-basis buffer memory; and for making the storage known to said bus control means, said syndrome calculating means, said error detecting means, and said error correcting means;

a means-basis ECC block code word recognition sub means for selecting code words of the ECC blocks to be processed, in accordance with the contents stored in said ECC-block-and-code word-division storing means, in controlling a data transfer from said bus control means to said syndrome calculating means, to said error detecting means, and to said error correcting means for error detection and error correction; in controlling the error correction done by said error correcting means; in controlling writing of error-corrected data to said ECC-block-basis buffer memory done by said bus control means; in storing mid-term results to said ECC-block-and-code word-division storing means by said error detecting means; and an ECC block code word recognition sub means in sub means-basis pipeline processing for making said first error detecting sub means, said even-numbered error correction sub means, said even-numbered error correction sub means, said number-of-times control sub means, and said DMA transfer instruction sub means in said system control means recognize that the error-corrected ECC blocks have been transmitted downstream and new ECC blocks to be processed have been stored in said ECC-block-basis buffer memory, and further making these same sub means contained in said system control means recognize the ECC blocks and the code words which are to be processed therein.

6. The error correction device of claim 5 further comprising:
two buffer memories each having a predetermined capacity equivalent to one sector or one ECC block;
a buffer memory storage means for alternately storing in said two buffer memories, in accordance with error correction speed, continuous data of the predetermined capacity which are a target of error correction and have been read from a DVD or a CD-ROM; and
an accessed buffer memory switch means for switching between said two buffer memories in order to read or write data as a target of error correction alternately in units of said predetermined capacity.

7. The error correction device of claim 1, wherein error correction is performed in parallel for data in a plurality of ECC blocks each having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction (data in the horizontal direction are referred to as sector) as a unit are subjected to the error correction, wherein
said buffer memory is a plural-ECC-block-division buffer memory corresponding to a plurality of ECC blocks to be processed in parallel;
said storing means for storing mid-term results of an error detecting process generated by said error detecting means is an ECC-block-division storing means for storing said plurality of ECC blocks on a block-by-block basis;
said system control means comprises:
a collective-type means-basis ECC block pipeline processing notification sub means for collectively transmitting ECC blocks which have been subjected to error correction downstream; for collectively storing ECC blocks to be processed next to said plural-ECC-block-division buffer memory; and for making the storage known to said bus control means, said syndrome calculating means, said error detecting means, and said error correcting means;
a collective-type means-basis ECC block recognition sub means for recognizing a data transfer from said bus control means to said syndrome calculating means, to said error detecting means, and to said error correcting means for error detection and error correction; for recognizing the error correction done by said error correcting means; for recognizing writing of error-corrected data to said plural-ECC-block-division buffer memory by said bus control means; for recognizing ECC blocks in process when said error detecting means stores mid-term results to said plural-ECC-block-division storing means, and for selecting ECC blocks to be processed; and
a collective-type ECC block notification sub means in sub means-basis pipeline processing for notifying said first error detecting sub means, said even-numbered error correction sub means, said odd-numbered error correction sub means, said number-of-times control sub means, and said DMA transfer instruction sub means contained in said system control means that the error-corrected ECC blocks have been collectively transmitted downstream and new ECC blocks to be processed have been collectively stored in said plural-ECC-block-division buffer memory, and further notifying these same sub means contained in said system control means of the ECC blocks which are in process therein.

8. The error correction device of claim 7 further comprising:
two buffer memories each having a predetermined capacity equivalent to one sector or one ECC block;
a buffer memory storage means for alternately storing in said two buffer memories, in accordance with error correction speed, continuous data of the predetermined capacity which are a target of error correction and have been read from a DVD or a CD-ROM; and
an accessed buffer memory switch means for switching between said two buffer memories in order to read or write data as a target of error correction alternately in units of said predetermined capacity.

9. The error correction device of claim 1, wherein error correction is performed in parallel for data in a plurality of ECC blocks each having a structure where a plurality of error correcting code words each comprising a data unit and a parity unit are arranged in vertical direction and horizontal direction so as to repeat error correction a plurality of number of times, and where predetermined data composed of a predetermined number of code words in the vertical direction or the horizontal direction (data in the horizontal direction are referred to as sector) as a unit are subjected to the error correction;
said buffer memory is an ECC-block-basis buffer memory for storing, on a block-by-block basis, ECC blocks to be processed in parallel;
said storing means for storing mid-term results of an error detecting process generated by said error detecting means is an ECC-block-and-code word-division storing means for storing ECC blocks in process on a block-by-block basis, and code words in each ECC block, in each sector, or in each sector group, on a string-by-string basis;
said system control means comprises:
a collective-type means-basis ECC block pipeline processing notification sub means for collectively transmitting ECC blocks which have been subjected to error correction downstream; for collectively storing ECC blocks to be processed next to said plural-ECC-block-division buffer memory; and for making the storage known to said bus control means, said syndrome calculating means, said error detecting means, and said error correcting means;
a collective-type means-basis ECC block code word recognition sub means for selecting code words of the ECC blocks to be processed, in accordance with the contents stored in said ECC-block-and-code word-division storing means, in controlling a data transfer from said bus control means to said syndrome calculating means, to said error detecting means, and to said error correcting means for error detection and error correction; in controlling the error correction done by said error correcting means; in controlling writing of error-corrected data to said ICC-block-basis buffer memory done by said bus control means; in storing mid-term results to said ICC-block-and-code word-division storing means by said error detecting means; and a collective-type ECC block notification sub means in sub means-basis pipeline processing for notifying said first error detecting sub means, said even-numbered error correction sub means, said odd-numbered error correction sub means, said number-of-times control sub means, and said DMA transfer instruction sub means contained in said system control means that the error-corrected ICC blocks have been collectively transmitted downstream and new ICC blocks to be processed have been collectively stored in said plural-ICC-block-division buffer memory, and further notifying these same sub means contained in said system control means of the ICC blocks which are in process therein.

10. The error correction device of claim 9 further comprising:

two buffer memories each having a predetermined capacity equivalent to one sector or one ECC block;

a buffer memory storage means for alternately storing in said two buffer memories, in accordance with error correction speed, continuous data of the predetermined capacity which are a target of error correction and have been read from a DVD or a CD-ROM; and an accessed buffer memory switch means for switching between said two buffer memories in order to read or write data as a target of error correction alternately in units of said predetermined capacity.

11. The error correction device of claim 1, further comprising:

two buffer memories each having a predetermined capacity equivalent to one sector or one ECC block;

a buffer memory storage means for alternately storing in said two buffer memories, in accordance with error correction speed, continuous data of the predetermined capacity which are a target of error correction and have been read from a DVD or a CD-ROM; and an accessed buffer memory switch means for switching between said two buffer memories in order to read or write data as a target of error correction alternately in units of said predetermined capacity.

* * * * *